United States Patent
Shrivastava et al.

(10) Patent No.: US 12,170,960 B2
(45) Date of Patent: Dec. 17, 2024

(54) METHODS AND SYSTEMS FOR HANDLING POWER SAVING SIGNALS TO IMPROVE POWER SAVING PERFORMANCE OF UE

(71) Applicant: SAMSUNG ELECTRONICS CO., LTD., Suwon-si (KR)

(72) Inventors: Vinay Kumar Shrivastava, Bangalore (IN); Avijit Manna, Bangalore (IN); Prashant Ashokchitare, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 521 days.

(21) Appl. No.: 17/608,600

(22) PCT Filed: May 4, 2020

(86) PCT No.: PCT/KR2020/005895
§ 371 (c)(1),
(2) Date: Nov. 3, 2021

(87) PCT Pub. No.: WO2020/226397
PCT Pub. Date: Nov. 12, 2020

(65) Prior Publication Data
US 2022/0217636 A1 Jul. 7, 2022

(30) Foreign Application Priority Data

May 3, 2019 (IN) .............................. 201941017703
Apr. 29, 2020 (IN) .............................. 201941017703

(51) Int. Cl.
*H04L 1/1812* (2023.01)
*H04L 5/00* (2006.01)
(Continued)

(52) U.S. Cl.
CPC ....... *H04W 52/0235* (2013.01); *H04L 1/1812* (2013.01); *H04L 5/0055* (2013.01); *H04W 72/23* (2023.01)

(58) Field of Classification Search
CPC ... H04L 1/1812; H04L 5/0053; H04L 5/0055; H04W 52/00; H04W 52/02;
(Continued)

(56) References Cited

U.S. PATENT DOCUMENTS 8,582,514 B2   11/2013   Moberg et al.
10,178,682 B2   1/2019   Loehr et al.
(Continued)

FOREIGN PATENT DOCUMENTS

CN   106899941   6/2017
CN   109219116   1/2019
(Continued)

OTHER PUBLICATIONS

VIVO,'C-DRX enhancement for power saving with WUS' R2-1903199,3GPP TSG-RAN WG2 Meeting #105bis, Mar. 29, 2019 section2.

(Continued)

*Primary Examiner* — Matthew W Genack
(74) *Attorney, Agent, or Firm* — F. Chau & Associates, LLC

(57) ABSTRACT

Methods and systems for handling power saving signals to improve power saving performance of UE. A method disclosed herein includes enabling, a User Equipment (UE), to monitor a Physical Downlink Control Channel (PDCCH) for downlink control information based on a reception of power saving signals from a Base Station with respect to a discontinuous-reception (DRX) cycle. The power saving signals include a Wake Up Signal (WUS), Go To Sleep (GTS) signal and PDCCH adaptation signal. The method further includes
(Continued)

enabling the UE to monitor the PDCCH, if the WUS indicates presence of the PDCCH and enables the UE to skip the monitoring of the PDCCH during an On-duration of the DRX cycle, if the WUS indicates absence of the PDCCH. The method further includes enabling the UE to skip the monitoring of the PDCCH in an active time of the DRX cycle, on receiving the GTS signal.

18 Claims, 15 Drawing Sheets

(51) Int. Cl.
*H04W 52/02* (2009.01)
*H04W 72/23* (2023.01)

(58) Field of Classification Search
CPC ......... H04W 52/0203; H04W 52/0209; H04W 52/0212; H04W 52/0225; H04W 52/0229; H04W 52/0232; H04W 52/0235; H04W 72/20; H04W 72/23; H04W 76/20; H04W 76/28
See application file for complete search history.

(56) References Cited

U.S. PATENT DOCUMENTS

| | | | |
|---|---|---|---|
| 2013/0021995 A1 | 1/2013 | Ehsan et al. | |
| 2014/0036748 A1 | 2/2014 | Mukherjee et al. | |
| 2014/0211679 A1* | 7/2014 | Gupta | H04W 52/0212 370/311 |
| 2015/0163741 A1 | 6/2015 | Sheth et al. | |
| 2016/0234810 A1* | 8/2016 | Wong | H04W 24/02 |
| 2017/0257807 A1 | 9/2017 | Zacharias et al. | |
| 2018/0332655 A1 | 11/2018 | Ang et al. | |
| 2019/0098644 A1 | 3/2019 | Loehr et al. | |
| 2020/0150736 A1* | 5/2020 | Nam | G06F 1/3209 |
| 2020/0205076 A1 | 6/2020 | Chen et al. | |
| 2020/0351786 A1* | 11/2020 | Koskela | H04W 52/0235 |
| 2021/0306952 A1 | 9/2021 | Kuang et al. | |
| 2022/0159574 A1* | 5/2022 | Islam | H04W 52/0219 |

FOREIGN PATENT DOCUMENTS

| | | |
|---|---|---|
| EP | 3826369 | 5/2021 |
| WO | 2014065997 | 5/2014 |
| WO | 2015056920 | 4/2015 |
| WO | 2016015003 | 1/2016 |
| WO | 2018210135 | 11/2018 |
| WO | 2018212867 | 11/2018 |
| WO | 2019-033112 | 2/2019 |
| WO | WO2019032009 A1 | 2/2019 |
| WO | 2019-063336 | 4/2019 |
| WO | 2021020952 | 4/2021 |

OTHER PUBLICATIONS

'3GPP:TSG RAN:NR:Study on UE Power Saving (Release 16)', 3GPP TR 38.840 V1.0.0, Mar. 14, 2019, pp. 9,11,19,26,34-35,3-39,55-57.
Mediatek Inc., 'Ue traffic adaptation for power saving', R2-1903878, 3GPP TSG-RAN WG2 Meeting #105bis, Mar. 29, 2019 section 2.
3GPP TS 38.321 V15.5.0 (Mar. 2019).
EESR Dated Apr. 5, 2023 In Corresponding EP Patent Application No. 20802877.9.
Samsung: "UE power consumption reduction in RRM measurement", 3GPP Draft; R1-1902319 UE Power Consumption Reduction in RRM Measurement, 3rd Generation Partnership Project (3GPP), Mobile Competence Centre; 650, Route Des Lucioles; F-06921 Sophia-Antipolis Cedex; Athens, GR, Feb. 25-Mar. 1, 2019.
EP Partial Search Report Issued Dec. 16, 2022 in Corresponding EP Patent Application No. 20802877.9.
"PDCCH monitoring related aspects of power savings",Ericsson,3GPP TSG-RAN WG1 Meeting #96bis Tdoc R1-1905470,Apr. 3, 2019.
1st Office Action issued Jul. 29, 2023 in corresponding CN Patent Application No. 202080033491.3.
Office Action issued in corresponding CN Patent Application No. 202080033491.3 issued Mar. 12, 2024.

* cited by examiner

[Figure 1]
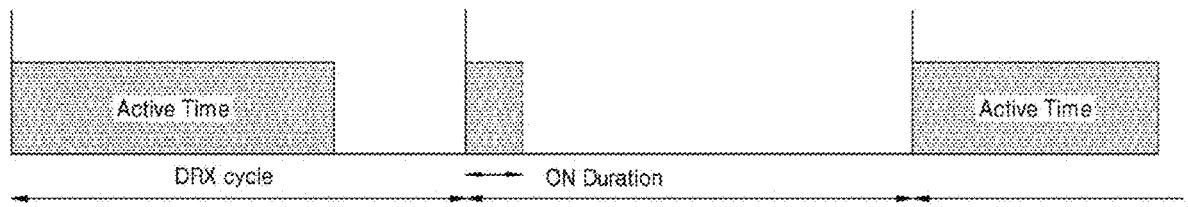

【Figure 2】
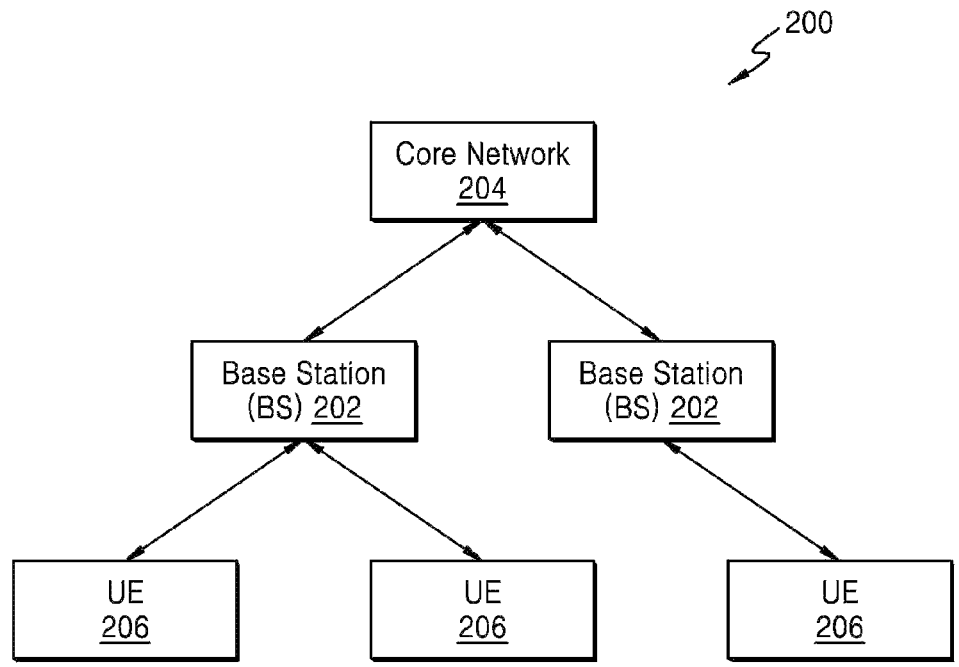
【Figure 3】
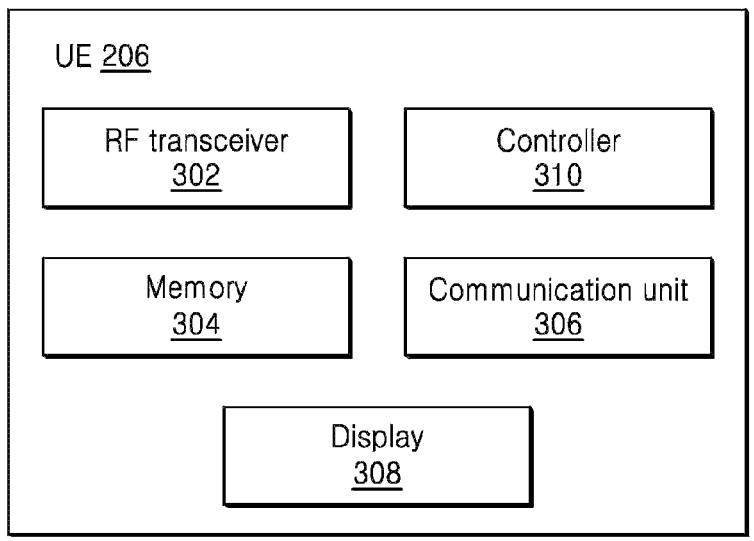

[Figure 4]
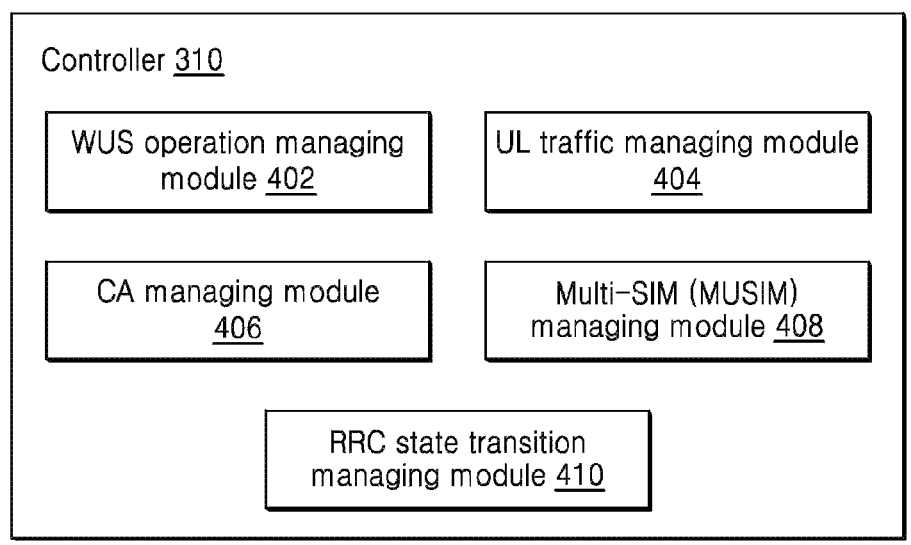

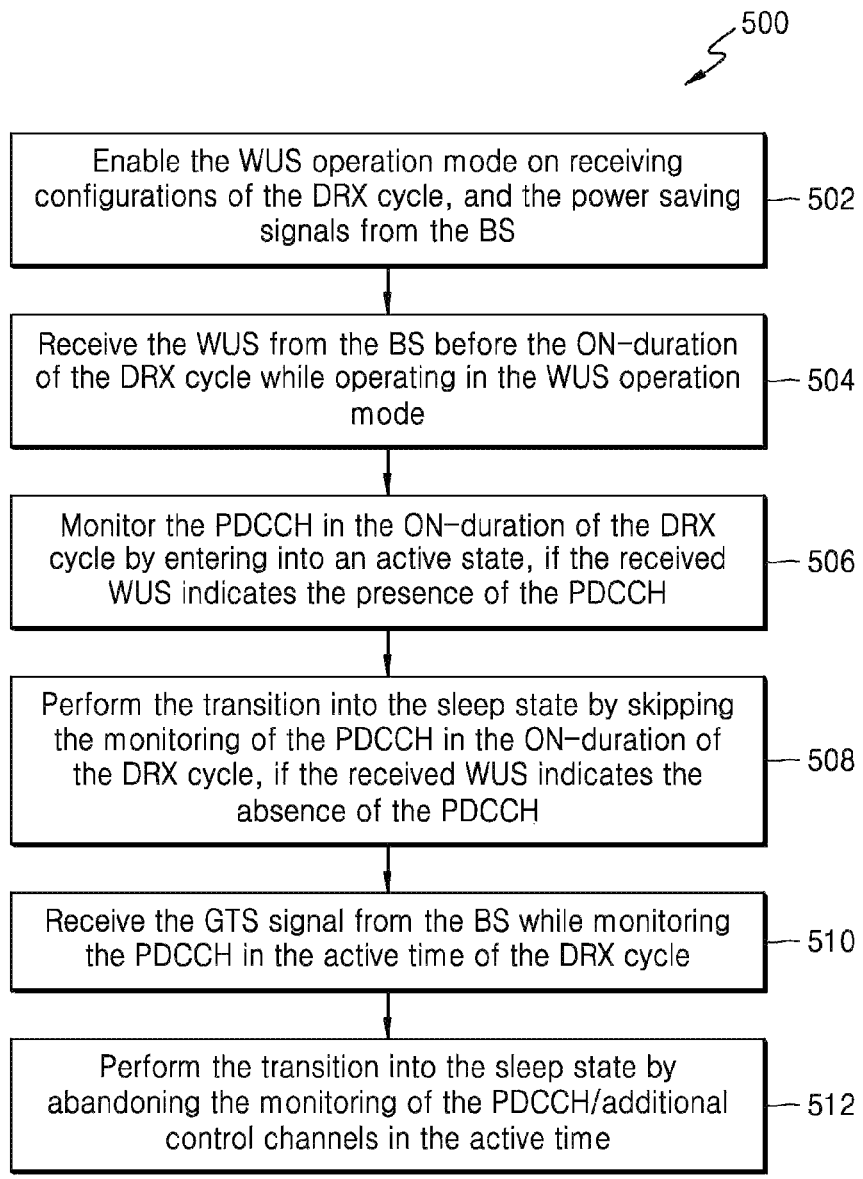

[Figure 6]
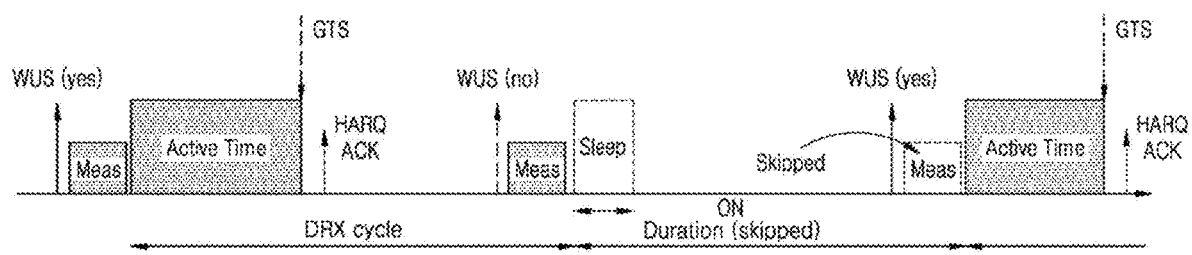

【Figure 7】
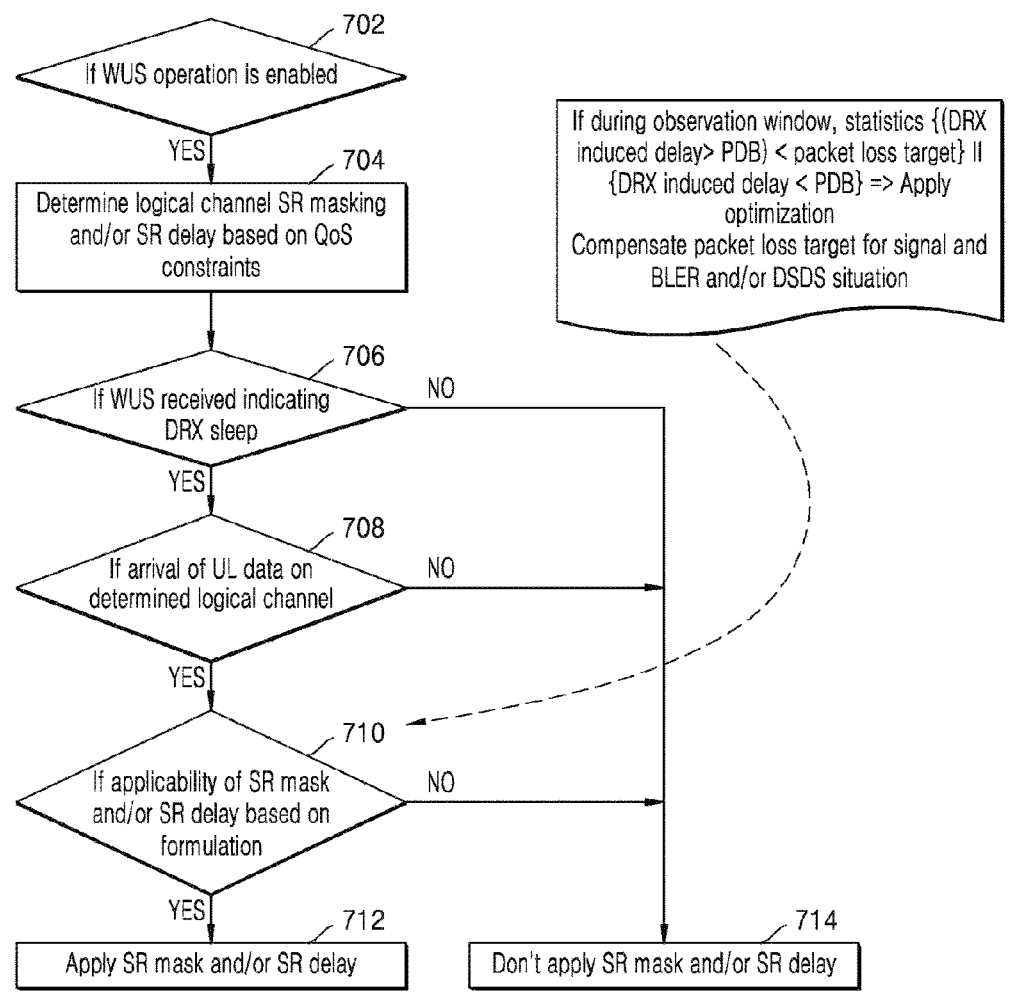

【Figure 8】
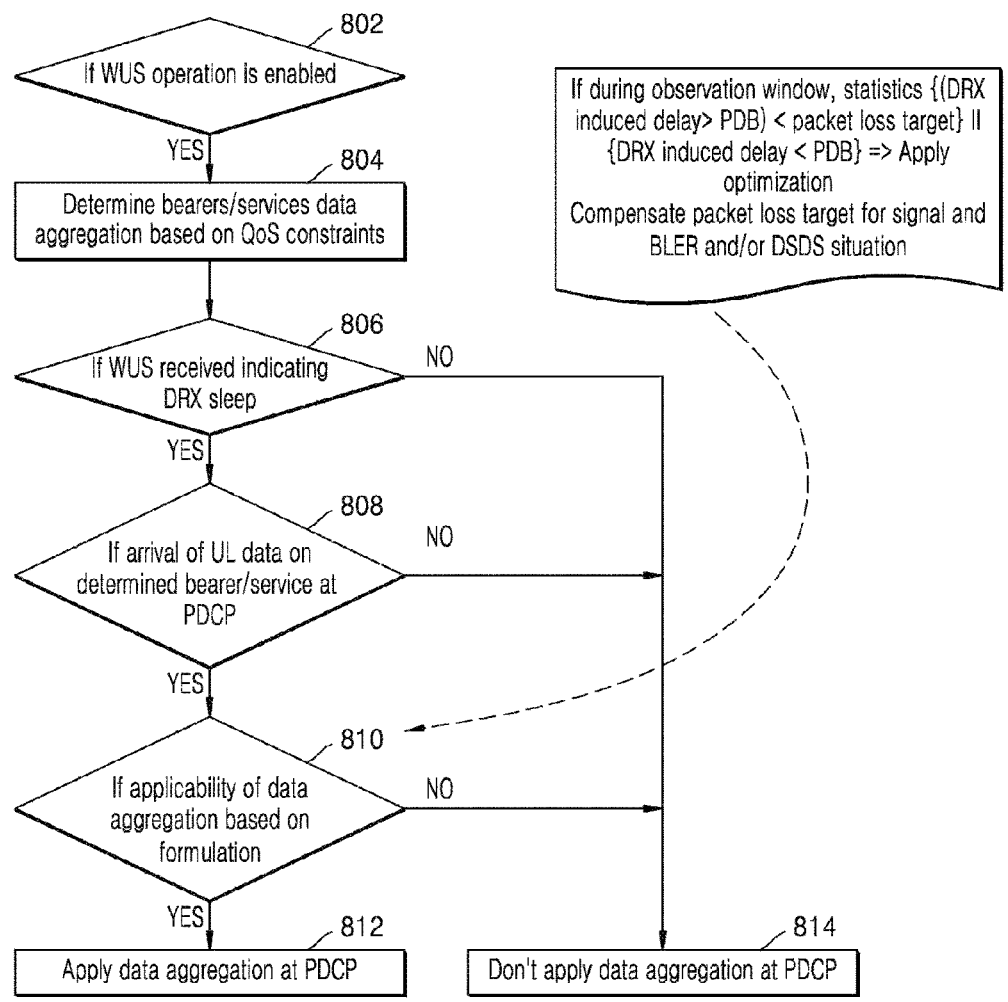

[Figure 9]
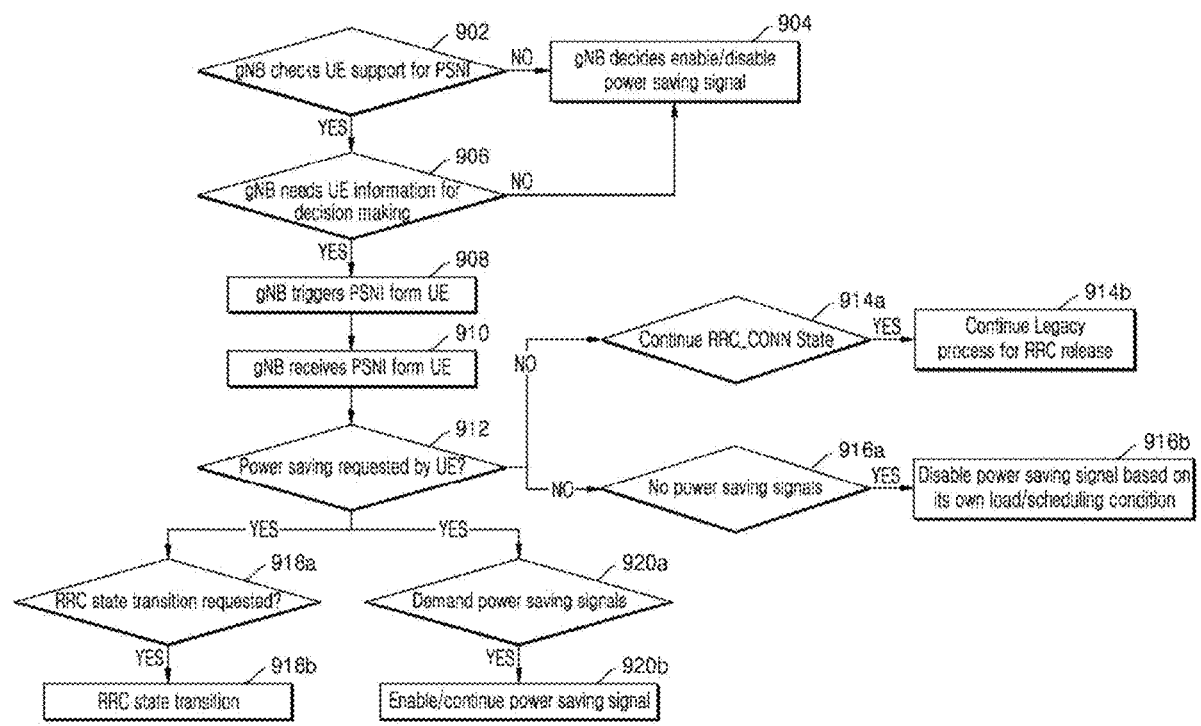

[Figure 10]
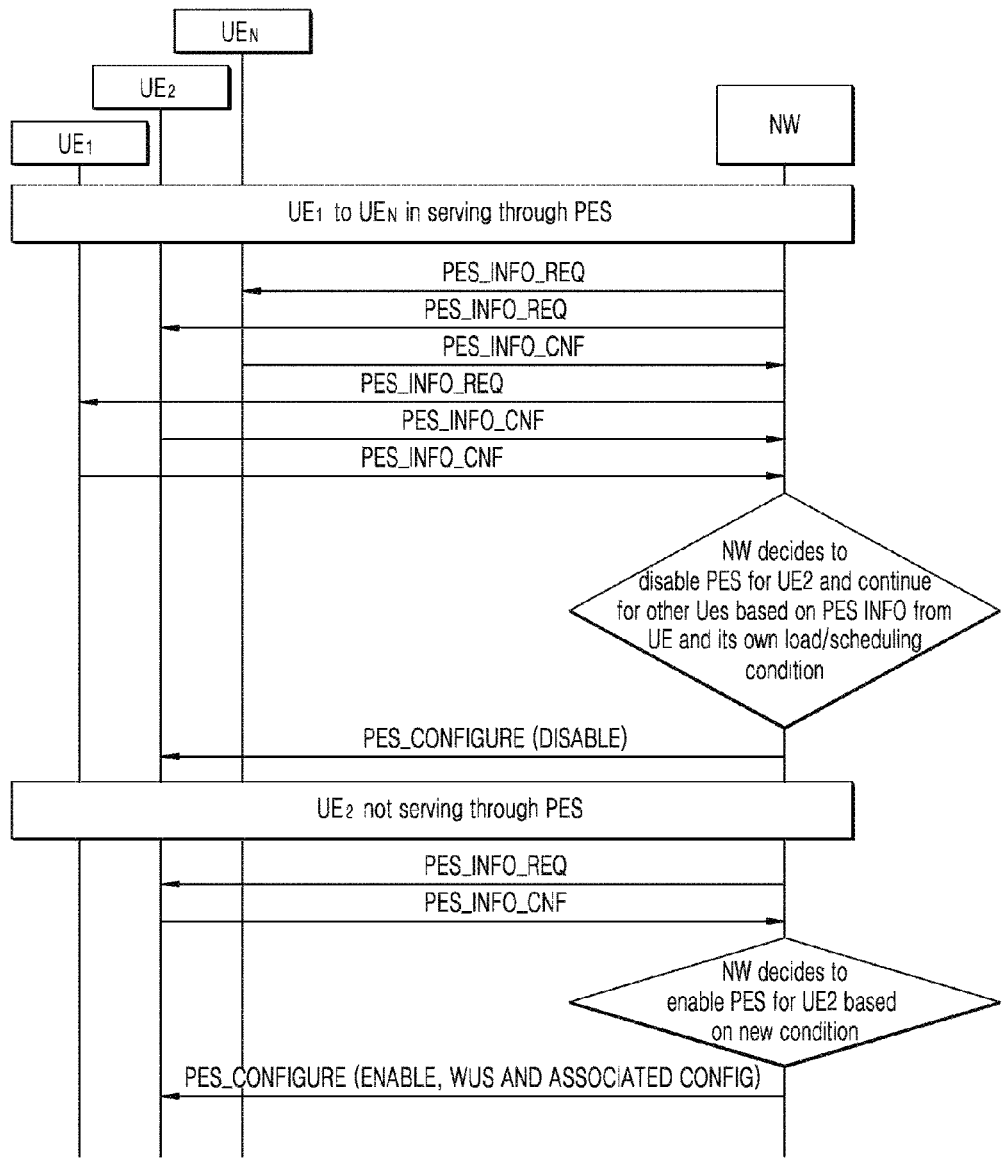

【Figure 11a】
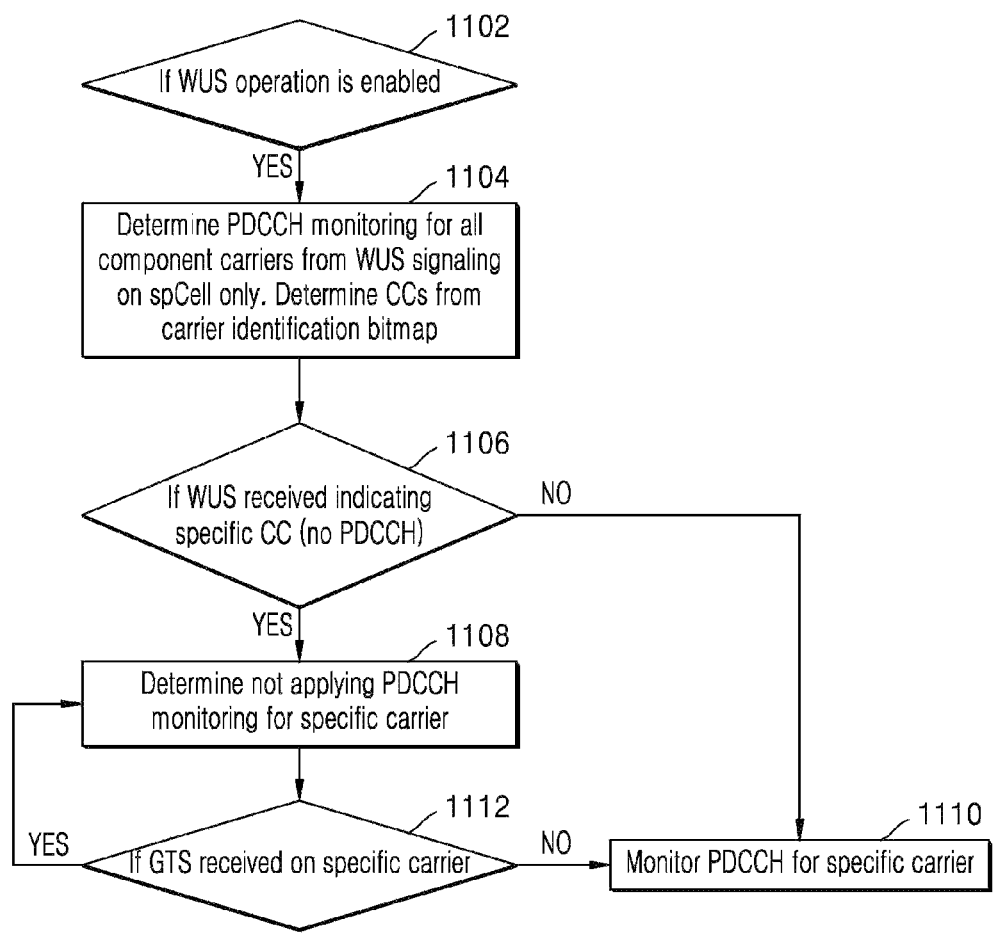

【Figure 11b】
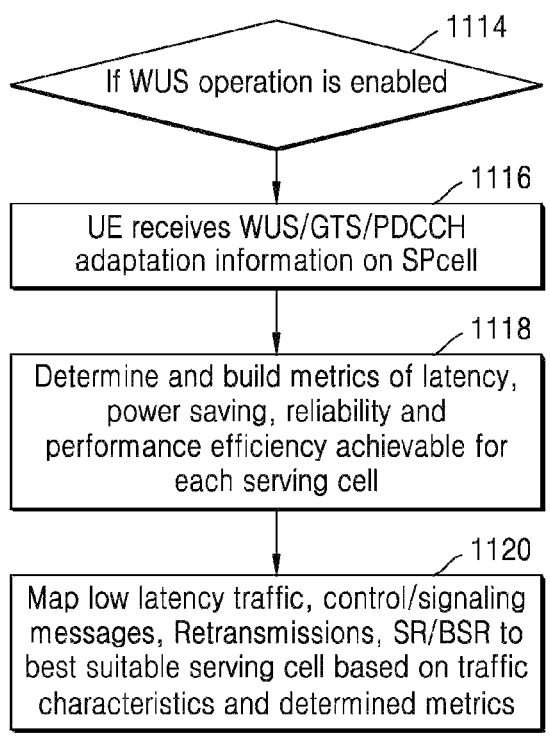

【Figure 12a】
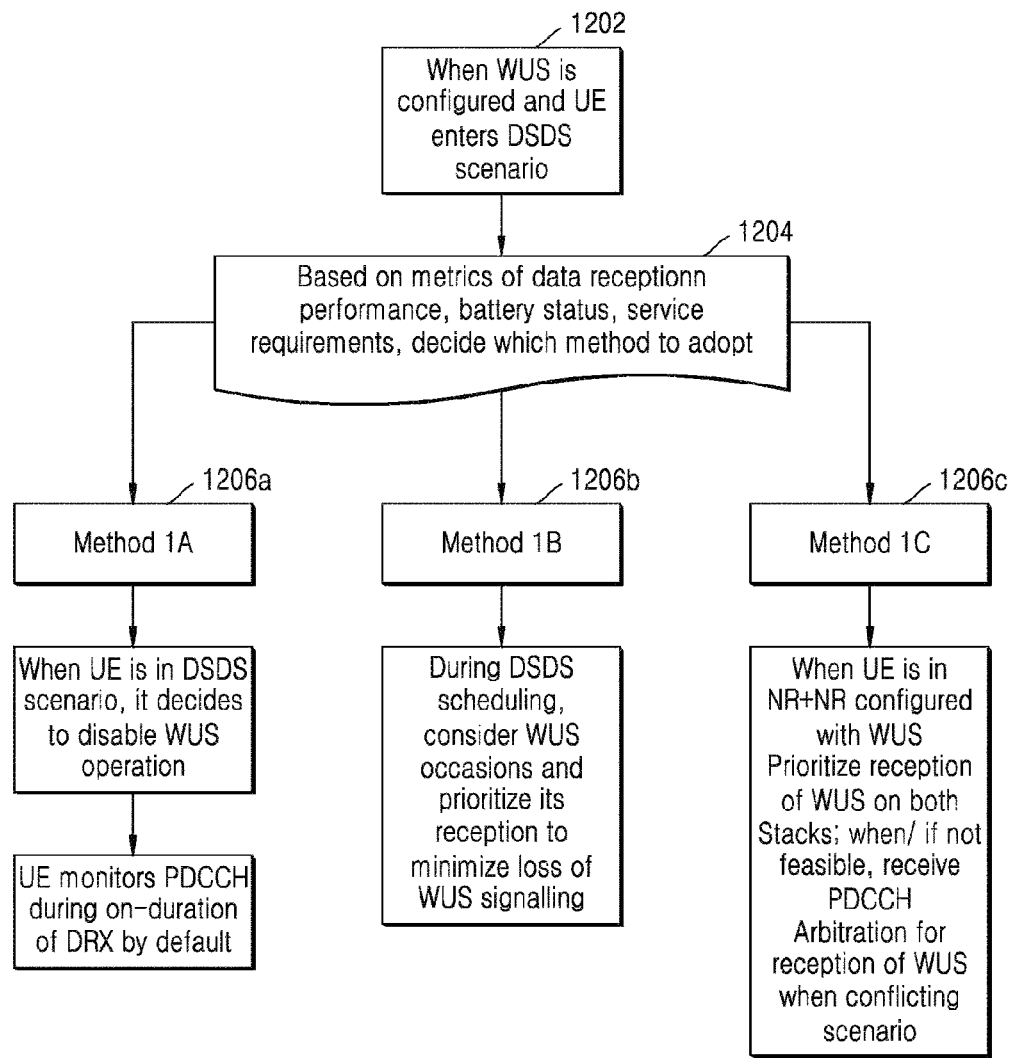

【Figure 12b】
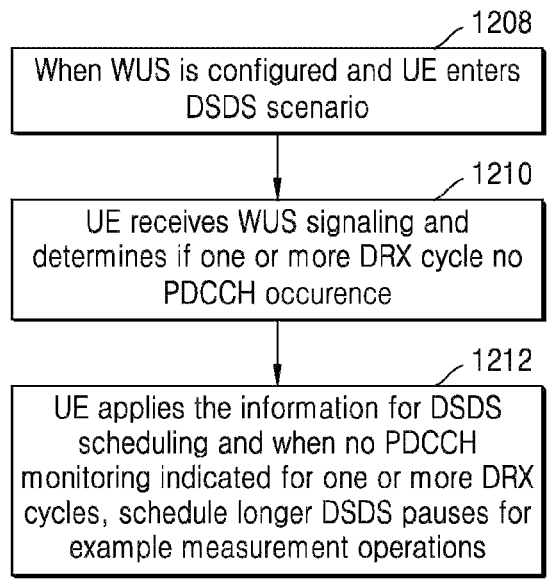
【Figure 13】
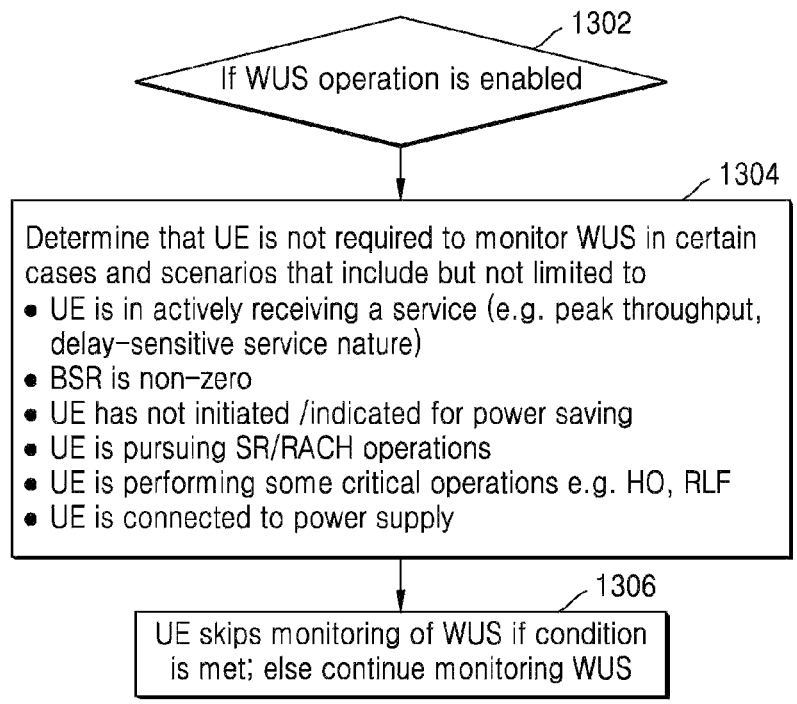

[Figure 14a]
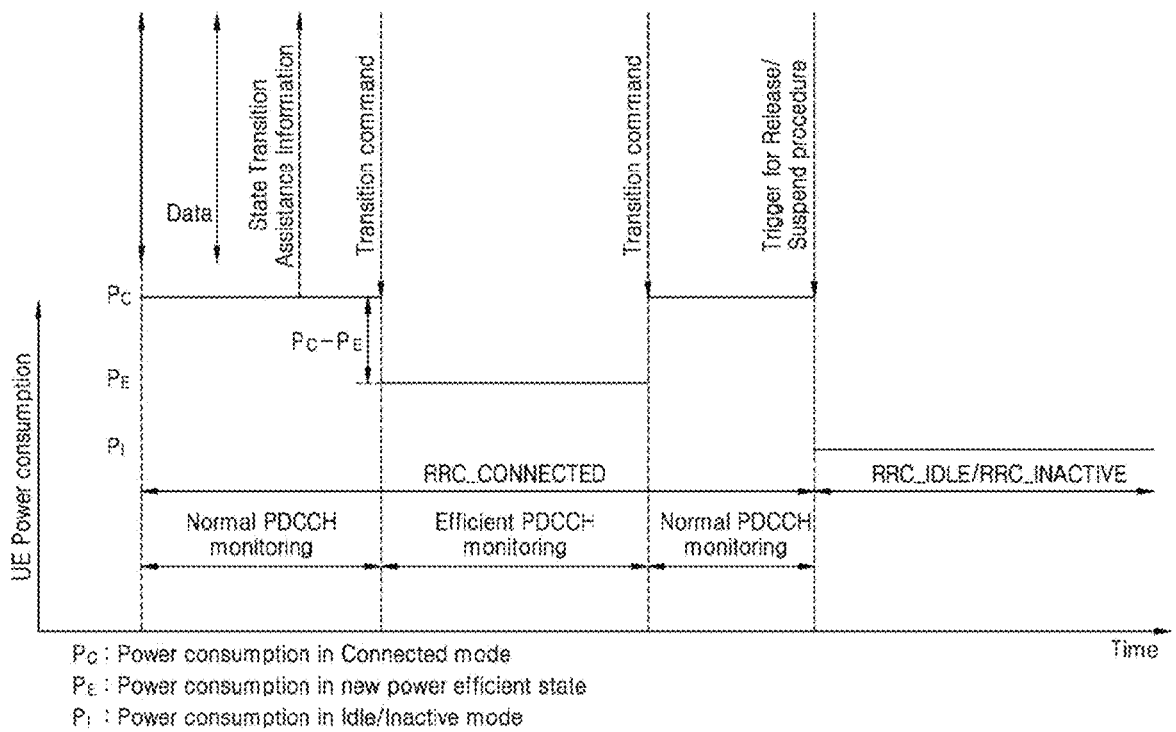

[Figure 14b]
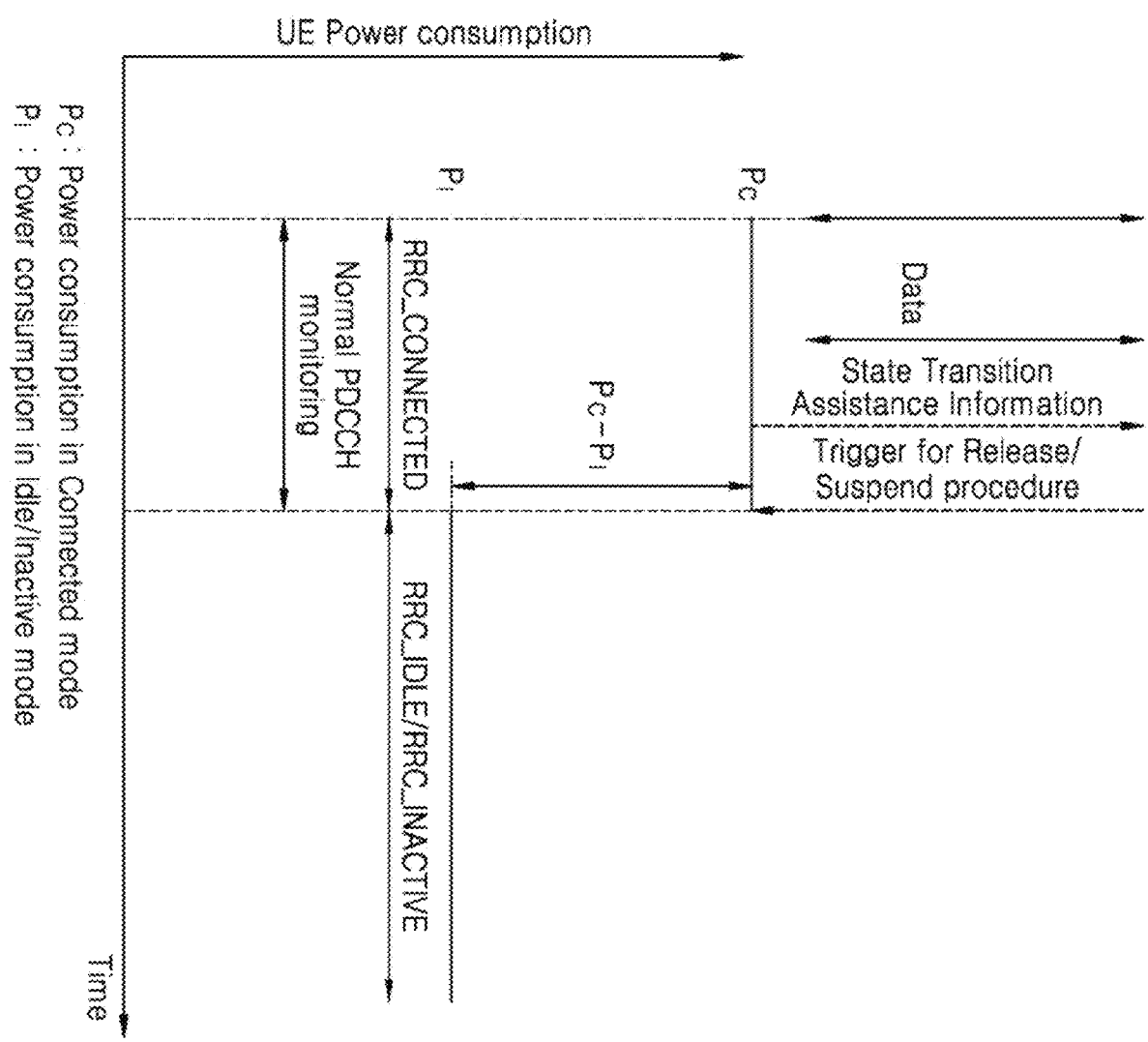

METHODS AND SYSTEMS FOR HANDLING POWER SAVING SIGNALS TO IMPROVE POWER SAVING PERFORMANCE OF UE

CROSS-REFERENCE TO RELATED APPLICATIONS

The present application is a National Stage application, filed under 35 U.S.C. § 371, of International Patent Application No. PCT/KR2020/005895 filed on May 4, 2020, which claims priority to Indian Patent Application No. 201941017703 filed on May 3, 2019, and Indian Patent Application No. 201941017703 filed on Apr. 29, 2020, the contents of which are incorporated by reference herein in their entirety.

TECHNICAL FIELD

This application is based on and derives the benefit of Indian Provisional Application and Indian Application 201941017703 as filed on 3 May 2019, and 29 Apr. 2020 the contents of which are incorporated herein by reference.

The present disclosure relates to the field of wireless communication systems and more particularly to efficiently handling power saving signals in a wireless communication system to improve power saving performance of a User Equipment (UE).

BACKGROUND ART

In a wireless communication network, a User Equipment (UE) can operate in a connected-mode with discontinuous reception (C-DRX) to monitor a Physical Downlink Control Channel (PDCCH) for possible allocation of data.

As depicted in FIG. 1, in the C-DRX mode, the UE may subsequently periodically wake up for brief duration of time to monitor the PDCCH as a downlink control channel for the allocation of the data. Such a period may be referred to as DRX cycle. In the DRX cycle, the UE may monitor the PDCCH using an on-duration timer. Generally, the on-duration timer starts at beginning of every DRX cycle such that the UE monitors the PDCCH until the on-duration timer expires. However, monitoring of the PDCCH in the C-DRX mode may increase the power consumption of the UE, since data allocation is not guaranteed always in the PDCCH.

Further, the UE keeps awake during measurement operations, which depends on measurement samples, and frequency. However, in such operations, the on-duration timer value and/or awake period of the UE may be prolonged, since an alignment of the DRX and measurement resource occurrence is not guaranteed. Thus, the power consumption of the UE may be increased.

Further, the UE may consume excess power in a RRC_CONNECTED mode, when there is no immediate data exchange (hereinafter referred to as power inefficient RRC_CONNECTED mode). In such a case, the UE has to transit from the RRC_CONNECTED mode into a RRC_IDLE mode as early as possible. As in NR Release 15, the transition of the UE from the RRC_CONNECTED mode to the RRC_IDLE mode occurs only upon a reception of an RRCRelease message from a Base Station (BS) or upon an expiry of a DataInactivityTimer. However, such approaches are not power efficient, as it takes time (for example: minimum 60 ms after receiving RRCRelease message, and minimum 1 sec in case of DataInactivityTimer based transition), during which the UE experiences unnecessary power consumption. Also, the UE may remain in the power inefficient RRC_CONNECTED mode for a longer period of time, when the DataInactivityTimer is configured with higher values. The DataInactivityTimer may be configured with shorter values that enable the UE to transit out of the power inefficient RRC_CONNECTED mode quickly. However, configuring the DataInactivityTimer with the shorter values may not always be desirable, as it may increase undesired ping-pong between the RRC_CONNECTED and the RRC_IDLE modes in certain scenarios.

In addition, the BS may require time before deciding to apply a RRC release procedure to transit the UE to the RRC_IDLE/RRC_INACTIVE mode based on downlink/uplink traffic conditions. Thus, the UE remains in the power inefficient RRC_CONNECTED mode even when there is no real downlink/uplink traffic. At the same time, the BS may not able to perform the RRC release procedure always due to dependency on several network factors (for example: traffic pattern, load condition, and so on).

DISCLOSURE

Technical Problem

The principal object of the embodiments herein is to disclose methods and systems for improving power saving performance of a User Equipment (UE) by efficiently handling power saving signals, wherein the power saving signals include a Wake Up Signal (WUS), a Go To Sleep (GTS) signal and a Physical Downlink Control Channel (PDCCH) adaptation signaling.

Another object of the embodiments herein is to disclose methods and systems for enabling the UE to monitor a PDCCH for downlink control information based on a reception of the WUS, the GTS signal and the PDCCH adaption signaling from a Base Station (BS) with respect to a discontinuous-reception (DRX) cycle.

Another object of the embodiments herein is to disclose methods and systems for enabling the UE to monitor the PDCCH, if the WUS indicates presence of the PDCCH and enables the UE to skip the monitoring of the PDCCH during an On-duration of the DRX cycle, if the WUS indicates absence of the PDCCH.

Another object of the embodiments herein is to disclose methods and systems for enabling the UE to skip the monitoring of the PDCCH in an active time of the DRX cycle, on receiving the GTS signal.

Another object of the embodiments herein is to disclose methods and systems for enabling the UE to adapt the monitoring of the PDCCH in the active time of the DRX cycle, on receiving the PDCCH adaptation signaling.

Another object of the embodiments herein is to disclose methods and systems for managing uplink traffic arrived on the UE by performing at least one of a Schedule Request (SR) masking, a SR delay operation, and a data aggregation operation, on receiving the WUS indicating the absence of the PDCCH.

Another object of the embodiments herein is to disclose methods and systems for dynamically enabling or disabling the power saving signals for the UE based on a power saving indication information (PSNI) of the UE.

Another object of the embodiments herein is to disclose methods and systems for managing monitoring of the PDCCH for different activated serving cells independently on receiving a carrier identification bitmap in the WUS.

Another object of the embodiments herein is to disclose methods and systems for managing traffic adaptation and mapping of traffic to the activated serving cell on receiving the carrier identification bitmap and associated information in the WUS/GTS/PDCCH adaptation signaling.

Another object of the embodiments herein is to disclose methods and systems for enabling the UE to disable monitoring of the power saving signals on determining no-power saving conditions.

Another object of the embodiments herein is to disclose methods and systems for managing a Multi-Subscriber Identity Module (SIM) (MUSIM) state of the UE using the power saving signals, wherein in the MUSIM state, the UE connects to multiple Radio Access Technologies (RATs) using multiple Subscriber Identity Modules (SIMs).

Another object of the embodiments herein is to disclose methods and systems for enabling the UE to perform Radio Resource Control (RRC) state transitions efficiently signaling the need for power saving signals (PSNI).

Technical Solution

Accordingly, the embodiments herein provide methods and systems for managing monitoring of Physical downlink Control Channel (PDCCH) in a wireless communication system, the method comprising. A method disclosed herein includes enabling, by a User Equipment (UE), a Wake Up Signal (WUS) operation mode, on receiving configurations of a discontinuous reception (DRX) cycle and at least one power saving signal from a Base Station (BS), wherein the at least one power saving signal include a WUS. The method further includes receiving, by the UE, the WUS from the BS before an On-duration of the DRX cycle in the enabled WUS operation mode. The method further includes monitoring, by the UE, the PDCCH for downlink control information, if the received WUS indicates presence of the PDCCH. The method further includes performing, by the UE, a transition into a sleep state during the ON-duration of the DRX cycle, if the received WUS indicates absence of the PDCCH.

Accordingly, embodiments herein provide a wireless communication system including a Base Station (BS), and a User Equipment (UE) coupled to the BS. The UE is configured to enable a Wake Up Signal (WUS) operation mode, on receiving configurations of a discontinuous reception (DRX) cycle and at least one power saving signal from the BS, wherein the at least one power saving signal include a WUS. The UE is further configured to receive the WUS from the BS before an On-duration of the DRX cycle in the enabled WUS operation mode. The UE is further configured to monitor the PDCCH for downlink control information, if the received WUS indicates presence of the PDCCH. The UE is further configured to perform a transition into a sleep state during the ON-duration of the DRX cycle, if the received WUS indicates absence of the PDCCH.

These and other aspects of the example embodiments herein will be better appreciated and understood when considered in conjunction with the following description and the accompanying drawings. It should be understood, however, that the following descriptions, while indicating example embodiments and numerous specific details thereof, are given by way of illustration and not of limitation. Many changes and modifications may be made within the scope of the example embodiments herein without departing from the spirit thereof, and the example embodiments herein include all such modifications.

DESCRIPTION OF DRAWINGS

Embodiments herein are illustrated in the accompanying drawings, throughout which like reference letters indicate corresponding parts in the various figures. The embodiments herein will be better understood from the following description with reference to the drawings, in which:

FIG. 1 depicts a conventional connected-mode with discontinuous reception (C-DRX) cycle to monitor a Physical Downlink Control Channel (PDCCH);

FIG. 2 depicts a wireless communication system, according to embodiments as disclosed herein;

FIG. 3 depicts a User Equipment (UE) of the wireless communication system, according to embodiments as disclosed herein;

FIG. 4 is a block diagram depicting components of a controller of the UE configured to manage reception of the power saving signals for monitoring the PDCCH, according to embodiments as disclosed herein;

FIG. 5 is a flow diagram depicting a method for monitoring the PDCCH using the power saving signals in the wireless communication system, according to embodiments as disclosed herein;

FIG. 6 is an example diagram depicting monitoring of the PDCCH based on the power saving signals, according to embodiments as disclosed herein;

FIG. 7 is an example flow diagram depicting a method for managing UL traffic while operating in a WUS operation mode, wherein the UL traffic is managed by performing a Schedule Request (SR) masking and/or a SR delay operation, according to embodiments as disclosed herein;

FIG. 8 is an example flow diagram depicting a method for managing UL traffic while operating in the WUS operation mode, wherein the UL traffic is managed by performing the data aggregation at a PDCP layer of the UE, according to embodiments as disclosed herein;

FIG. 9 is an example flow diagram depicting a method for dynamically enabling or disabling the WUS operation mode based on requirements of the power saving signals for the UE, according to embodiments as disclosed herein;

FIG. 10 depicts an example scenario of enabling/disabling the power saving signals for the UE, according to embodiments as disclosed herein;

FIGS. 11a and 11b are example flow diagrams depicting a method for managing Carrier Aggregation (CA) scenarios using the power saving signals, according to embodiments as disclosed herein;

FIG. 12a is a flow diagram depicting a method for managing the reception of the WUS in a multi-Subscriber Identity Module (SIM) (MUSIM) scenario, according to embodiments as disclosed herein;

FIG. 12b is a flow diagram depicting another method for managing the reception of the WUS in the MUSIM scenario, according to embodiments as disclosed herein;

FIG. 13 is a flow diagram depicting a method for managing the WUS operation mode based on the power saving conditions, according to embodiments as disclosed herein; and FIGS. 14a and 14b are example diagrams depicting management of the RRC state transitions using the power saving signals, according to embodiments as disclosed herein.

MODE FOR INVENTION

The example embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The description herein is intended merely to facilitate an understanding of ways in which the example embodiments herein can be practiced and to further enable those of skill in the art to practice the example embodiments herein. Accordingly, this disclosure should not be construed as limiting the scope of the example embodiments herein.

Embodiments herein disclose methods and systems for reducing power consumption of a User Equipment (UE) by managing power saving signals in a wireless communication network.

Referring now to the drawings, and more particularly to FIGS. 2 through 14b, where similar reference characters denote corresponding features consistently throughout the figures, there are shown example embodiments.

FIG. 2 depicts a wireless communication system 200, according to embodiments as disclosed herein. The wireless communication system/network 200 referred herein can be configured to improve power saving performance of User Equipments (UEs) by enabling the UEs to receive power saving signals with Discontinuous Reception (DRX) cycle and to monitor control channels for allocation of data resources based on the received power saving signals.

The wireless communication system 200 includes at least one Base Station 202, at least one Core Network (CN) 204, and at least one UE 206.

The BS/Radio Access Network (RAN) 202 can be configured to communicate with the UEs 206. The BS 202 may comprise of nodes such as, but not limited to, evolved nodes (eNBs), New Radio nodes (gNBs), and so on. The BS 202 can communicate with the UEs 206 via same or different Radio Access Technologies (RATs). Examples of the RATs can be, but is not limited to, a Third Generation Partnership Project (3GPP) 3rd Generation (3G), an Long Term Evolution (LTE/4G) network, an LTE-Advanced (LTE-A) network, a Fifth Generation (5G) New Radio (NR) network, a Wireless Local Area Network (WLAN), a Worldwide Interoperability for Microwave Access (WiMAX/IEEE 802.16), Wi-Fi (IEEE 802.11), an Evolved-UTRA (E-UTRA), an LTE/4G communication system, a 5G/NR communication system, or any other next generation networks. The BS 202 can transmit control signaling and data plane messages to the UE 206 in a downlink (DL) transmission, and receive the control signaling and the data plane messages from the UE 206 in an uplink (UL) transmission.

The BS 202 can also be configured to communicate with the CN 204 and to connect the UEs 206 to the CN 204. The CN 204 can be at least one of an Evolved Packet Core (EPC), a 5G core (5GC) network, or the like. The CN 204 can be configured to connect the UEs 206 to an external data network for exchanging data (for example; (for example: text messages, media (for example; audio, video, images, data packets, and so on), sensor data, and so on)). Examples of the external data network can be, but not limited to, the Internet, a Packet Data Network (PDN), an Internet Protocol (IP) Multimedia Core Network Subsystem, and so on. The BS 202 and the CN 204 may comprise of one or more processors/Central Processing Units (CPUs), a memory, a storage, a transceiver, and so on, for performing at least one intended function/operation.

The BS 202 can also be configured to perform radio resource management functions such as, but not limited to, radio bearer control, radio admission control, connection mobility control, dynamic allocation of resources to the UE in uplink/downlink (scheduling), and so on.

In an embodiment, the BS 202 can configure the UE 206 with functionalities of a Discontinuous Reception (DRX) cycle and power saving signals for monitoring a control channel. In an embodiment, the BS 202 can transmit configurations of the DRX cycle and the power saving signals (DRX configurations and power saving signals configurations) to the UE 206 in a Radio Resource Control (RRC) signaling. In an embodiment, the BS 202 can transmit the configurations of the power saving signals to the UE 206 in a search space configurations set.

In an embodiment herein, the control channel can be a Physical Downlink Control Channel (PDCCH). The PDCCH can be a physical channel, which carries downlink control information. In an example, the downlink control information can indicate at least one of a resource block carrying data, a demodulation scheme for decoding the data, and so on.

In an embodiment herein, the DRX cycle may indicate a periodical duration/interval for the UE 206 to monitor the PDCCH. The DRX cycle may specify a periodic repetition of an ON duration for monitoring the PDCCH followed by a period of inactivity. The ON-duration may be a time period or an awake period during which the UE 206 has to monitor the PDCCH. During the period of inactivity, the UE 206 does not monitor the PDCCH. In an embodiment, the DRX cycle can be a UE specific DRX cycle, wherein the UE 206 itself applies a DRX cycle length that is different from network configured DRX length (for example: to support some critical services (like MCPTT)). In an embodiment, the DRX operation can be an extended DRX cycle, which includes longer DRX cycle lengths. In an example, low cost low power devices/low cost UEs like IoT devices use the extended DRX.

In an embodiment herein, the power saving signals can be a Wake Up Signal (WUS), a Go To Sleep (GTS) signal and a PDCCH adaptation signaling.

The WUS can be a very low power consuming signal indicating presence or absence of the PDCCH. In an embodiment, the BS 202 can transmit the WUS to the UE 206 before the ON duration of the DRX cycle and enable the UE 206 to use the WUS for monitoring the PDCCH. In an example, the UE 206 monitors the PDCCH during the ON-duration of the DRX cycle, if the WUS indicates the presence of the PDCCH. The UE 206 skips the monitoring of the PDCCH during the ON-duration of the DRX cycle, if the WUS indicates that the monitoring of the PDCCH is not required (i.e., the absence of the PDCCH). In an embodiment, an occurrence of the WUS with respect to the DRX cycle may be dependent on a slot format as directed by a static configuration Time-division duplexing-Uplink-Downlik configuration (TDD-UL-DL-configuration) or a dynamic configuration through slot format indicator (SFI) signaling. Therefore, in case of the transmission of the WUS before the on-duration of the DRX cycle, the occurrence of the WUS may be defined in terms of available DL symbol(s) and not a fixed time offset. In an example, the occurrence of the WUS is specified at an $X^{th}$ DL symbol in a Y slot offset before the ON-duration of the DRX cycle, where $0 \leq X \leq 13$, $Y \geq 1$, with determining factors. Examples of the determining factors can be, but not limited to, multiple UEs with similar DRX timings with common WUS resources, measurement opportunities for automatic gain control (AGC) tuning, channel tracking, and so on. Thus, the occurrence of the WUS at the Xth DL symbol in the Y slot offset before the ON-duration may limit the power consumption of the UE 206 during a time gap between the WUS and the on-duration.

In an embodiment herein, the BS 202 may send the GTS signal to the UE 206, if the monitoring of the PDCCH is not required in an active time of the DRX cycle. Therefore, the UE 206 transits out of the active time (i.e. undertakes sleep and saves power). The active time is a time period during which the UE 206 monitors the PDCCH for PDCCH-subframes.

In an embodiment herein, the BS 202 may send the PDCCH adaptation signaling to the UE 206 in the active time, if the continuous monitoring of the PDCCH is not required in the active time of the DRX cycle. The PDCCH adaptation signaling triggers power saving approaches for the UE 206, so that the UE 206 can monitor the PDCCH in the active time of the DRX cycle based on power saving approaches triggered by the PDCCH adaptation signal. Examples of the power saving approaches can be, but not limited to, a cross-slot scheduling, or the like. In an example, if the BS 202 enables the power saving approach like the cross-slot scheduling in the PDCCH adaptation signaling, the UE 206 has to monitor the PDCCH in accordance with cross-slot scheduling patterns. Thus, results in the enhanced power saving.

In an embodiment, the BS 202 can transmit measurement resources in the time gap between the WUS and the ON-duration to the UE 206 for performing measurement operations. Examples of the measurement resources can be, but not limited to, Synchronization Signal Block (SSB), Channel State Information Reference Signal (CSIRS), and so on. In an embodiment, the measurement operations involve estimating factors associated with channels (that can be physical channels over which the UE 206 can send the data to the BS 202) such as, but not limited to, channel quality information, channel tracking, ACG tuning, and so on, based on the received measurement resources. In an embodiment, the measurement operations include, but not limited to, measurement of signal strengths/interference conditions and evaluating quantities such as, but not limited to, Reference Signal Receive Power (RSRP), Reference Signal Received Quality (RSRQ), Received Signal Strength Indicator (RSSI), Signal to Inference Noise Ratio (SINR), and so on. The UE 206 may perform the measurement operations over measurement resources (which are specific signal) transmitted by the BS 202. In an embodiment herein, the measurement resources can be specific for the UE 206. In an embodiment herein, the measurement resources can be specific for a group of UEs 206. For performing the measurement operations, the BS 202 may also provide information about a number of samples and duration for the measurement resources to the UE 206 based on mobility measurement and signal strength. The BS 202 may determine the mobility measurement of the UE 206 as a function of 'a' factor and 'B' factor. The 'a' factor can be dependent on whether the UE 206 is in static, low or high mobility situations (e.g. cell reselection rate, positioning information, and so on). The 'B' factor may be dependent on whether the UE 206 perceives low, medium or high signal strengths (for example: Reference Signal Receive Power (RSRP), Signal-to-interference-plus-noise ratio (SINR)) when receiving the data.

The UE(s) 206 can be a user device that can support the functionalities of the DRX cycle and the power saving signals. Examples of the UE 206 can be, but is not limited to, a mobile phone, a smartphone, a tablet, a phablet, a personal digital assistant (PDA), a laptop, a computer, a wearable computing device, a vehicle infotainment device, an Internet of Things (IoT) device, a Virtual Reality (VR) device, a Wireless Fidelity (Wi-Fi) router, a USB dongle, an auto-guided vehicle, or any other device that supports the functionalities of the power saving signal and the DRX cycle.

In an embodiment, the UE 206 can support one or more Subscriber Identity Modules (SIMs)/stacks of different RATs for establishing communication with the wireless communication system 200 (the BS 202/CN 204). The one or more stacks can be operated by the same service provider or different service providers. In an example, the UE 206 may be a multi-Subscriber Identity Module (SIM) (MUSIM) device that supports the one or more stacks of different RATs. In such a case, the UE 206 may use one of the stacks for establishing communication (for example; a call, such as a voice call, data call, data session, text messaging session, or any other data transfer session) with the wireless communication system 200 (the BS 202/CN 204). In an embodiment, the UE 206 supporting the one or more stacks and using at least one of the stacks for establishing the communication with the BS 202 may be referred hereinafter as MUSIM scenario/state through the document. In an example herein, consider that the UE 206 may use two stacks of the multiple stacks to establish the communication with the BS 202/CN 204. Such a scenario may be referred herein as a Dual Subscriber Identity Module Dual Standby (DSDS) scenario/state through the document.

In an embodiment, the UE 206 may support a user plane protocol stack including a physical layer (PHY) layer, a Media Access Control (MAC) layer, a Radio Link Control (RLC) layer, a Packet Data Convergence Protocol (PDCP) layer, and a Service Data Adaptation Protocol (SDAP). The SDAP layer, the PDCP layer, the RLC layer, and the MAC layer may process the data and forward the data to the PHY layer through one or more other layers. The PHY layer may perform the data transmission to the BS 202 or receive the data from the BS 202. The UE 206 may support a control plane stack including a RRC layer. The RRC layer handles radio-specific functionality that enables the UE 206 to exchange signaling messages with the BS 202. The RRC layer may handle the radio-specific functionality based on a state of the UE 206. The UE 206 may operate in an RRC idle mode, an RRC inactive mode and an RRC connected mode. In the RRC idle mode, the UE 206 may camp on a cell associated with the BS 202 after a cell selection process or cell reselection process based on factors such as, but not limited to, radio link quality, cell status, and so on (there may be no RRC connection establishment between the UE 206, and the BS 202). In the RRC inactive mode, the BS 202 may manage the mobility of the UE 206 or reach ability of the UE 206 using assistance information received from the CN 204 (there may be no RRC connection establishment between the UE 206, and the BS 202). In the RRC connected mode, an RRC connection may be established between the UE 26 and the BS 202, wherein the UE 206 can exchange the signaling messages with the BS 202 using the RRC connection.

The UE 206 can be configured to operate in a WUS operation mode by supporting the functionalities of the DRX cycle, and the power saving signals. The power saving signals include the WUS, the GTS, and the PDCCH adaptation signaling. The UE 206 can enable the WUS operation mode on receiving the DRX cycle configurations and the WUS configurations from the BS 202. The UE 206 can also enable the WUS operation mode on receiving an input from a user of the UE 206 for enabling the WUS operation mode. In the WUS operation mode, the UE 206 can monitor the PDCCH according to the power saving signals received from the BS 202 with respect to the DRX cycle. The UE 206 can also be configured to operate by supporting only the functionalities of the DRX cycle, on disabling the WUS operation mode due to the occurrence of the no-power saving conditions. On disabling the WUS operation mode, the UE 206 may monitor the PDCCH for the downlink control information based on the On-duration of the DRX cycle.

In an embodiment, if the WUS operation is enabled, the UE 206 may monitor the PDCCH for the downlink control information based on the WUS received from the BS 202 before the ON-duration of the DRX cycle. If the WUS received from the BS 202 indicates the presence of the PDCCH, the UE 206 enters into an active state in the ON-duration of the DRX cycle, and monitors the PDCCH for the downlink control information during the active time of the DRX cycle. The active state/wakeup state may refer to a state of the UE 206, wherein the UE 206 turns ON its Radio Frequency (RF) transceiver for reception/transmission of the data. If the WUS received from the BS 202 indicates the absence of the PDCCH, the UE 206 enters into a sleep state/power saving state by skipping the monitoring of the PDCCH in the ON-duration of the DRX cycle. The sleep state/power saving state/power efficient state may refer to a state of the UE 206, in which the UE 206 turns OFF its RF transceiver to reduce battery consumption.

In an embodiment, if the WUS operation is enabled, the UE 206 may receive the GTS signal received from the BS 202, if the monitoring of the additional control channel is not required in the active time of the DRX cycle. The GTS signal may indicate an early sleep state for the UE 206, so that the UE 206 may enter into the sleep state by skipping/abandoning monitoring of the additional control channels in the active time of the DRX cycle. In an embodiment, the UE 206 may receive the GTS signal from the BS 202 in a MAC signaling message (for example, a Medium Access Control-Control Element, (MAC CE)). On receiving the MAC signaling message (including the GTS signal), the UE 206 abandons the monitoring of the PDCCH and sends a Hybrid automatic repeat request (HARQ) acknowledgement (ACK) to the BS 202. The BS 202 may use the received HARQ ACK to ensure the successful transmission of the MAC signaling message including the GTS signal to the UE 206. In an embodiment, the UE 206 defers moving to the sleep state until HARQ ACK transmission is completed.

In an embodiment, if the WUS operation is enabled, the UE 206 may receive the PDCCH adaptation signal from the BS 202, if the continuous monitoring of the control channels is not required in the active time of the DRX cycle. The PDCCH adaptation signal may indicate triggering of the power saving approach for the UE 206, so that the UE 206 may skip continuous monitoring of the additional control channels in the active time of the DRX cycle by entering into a power saving state. In the power saving state, the UE 206 monitors the PDCCH in accordance with the power saving approach indicated in the received PDCCH adaptation signaling. Examples of the power saving approach can be, but is not limited to, a cross-slot scheduling based PDCCH monitoring, or the like. In an embodiment, the UE 206 may receive the PDCCH adaptation signal from the BS 202 in the MAC signaling message (for example, a MAC CE). On receiving the MAC signaling message (including the PDCCH adaptation signal which may include the power saving approach and associated parameters), the UE 206 skips the continuous monitoring of the PDCCH in the active time of the DRX cycle, and sends a HARQ ACK to the BS 202. The BS 202 may use the received HARQ ACK to ensure the successful transmission of the MAC signaling message including the PDCCH adaptation signal to the UE 206.

In an embodiment, if the WUS operation is enabled, the UE 206 may receive the measurement resources from the BS 202 in the time gap between the WUS and the ON-duration of the DRX cycle. The UE 206 may receive the measurement resources through a RRC reconfiguration message (for example: measurement resource configuration and measurement report configuration for performing the measurement operations) from the BS 202. The UE 206 may also receive the information such as, but not limited to, the number of samples, the duration for the measurement resources, and so on from the BS 202 based on the mobility management and the signal strength for performing the measurement operations. In an embodiment, the UE 206 may determine the information such as, but not limited to, the number of samples, the duration for the measurement resources, and so on, based on the mobility management and the signal strength for performing the measurement operations. The UE 206 may perform the measurement operations with achievable reliability and accuracy using the determined information based on the mobility management and the signal strength. Thus, the UE 206 may operate in the WUS operation mode with reduced power consumption.

In an embodiment, the UE 206 may maintain timers for monitoring the DRX cycle and other operations (for example; UL transmissions, DL transmissions, Scheduling Request (SR) operations, Random Access Control (RACH) operations, and so on). The UE 206 may maintain an ON-duration timer for tracking the ON-duration of the DRX cycle. The UE 206 may initiate the ON-duration timer during the monitoring of the PDCCH in the ON-duration, on determining the presence of the PDCCH from the received WUS. The UE 206 stops monitoring the PDCCH on an expiry of the ON-duration timer. The UE 206 may stop operating the ON-duration timer, if the UE 206 receives the GTS signal from the BS 202 while the ON-duration timer is operating. The UE 206 may maintain a data inactivity timer and initiate the data inactivity timer when the UE 206 receives the WUS or the GTS from the BS 202. The UE 206 may stop operating the data inactivity timer, if the received WUS indicates the absence of the PDCCH or if the received GTS is for the early sleep state. The UE 206 may restart the inactivity timer and enters into the active state, if the received WUS indicates the presence of the PDCCH. The UE 206 may maintain an UL transmission timer and a DL transmission timer for tracking the UL and DL data transmissions respectively. The UE 206 may stop operating the UL transmission timer and the DL transmission timer, if the received WUS indicates the absence of the PDCCH or if the received GTS is for the early sleep state.

The UE 206 may maintain and initiate a SR timer for performing a SR operation. The UE 206 may perform the SR operation for receiving uplink RF resources from the BS 202, when the UE 206 has data to transmit over at least one logical channel in the UL transmission. The logical channel can be a medium used by the UE 206 to communicate the data to the BS 202. The logical channel can be at least one of a logical voice channel, a logical data channel, and so on.

For example, when the UE 206 establishes a voice connection with an LTE network (RAT) using a voice over LTE protocol, the UE 206 may use the logical voice channel to communicate voice data packets to the BS 202 of the LTE network.

Similarly, when the UE 206 establishes a non-voice connection with the LTE network (for example: a data connection), the UE 206 may use the logical data channel to communicate the data packets to the BS 202 of the LTE network. The SR operation may involve sending a SR request to the BS 202 and receiving the uplink RF resources for sending the data over the at least one logical channel. The UE 206 maintains and initiates a RACH timer, and a Contention-based or Contention free RACH timer for performing the RACH operation. In an embodiment, the UE 206 ignores the WUS or the GTS signal, if the UE 206 receives the WUS or the GTS signal while performing the RACH operations.

The UE 206 may maintain UL HARQ buffers or DL HARQ buffers. If the UE 206 receives the GTS signal from the BS 202 when the UL HARQ buffers are not empty, the UE 206 has to maintain the UL HARQ buffers in a same state as the UL HARQ buffers may reflect presence of the UL data at the UE 206. The BS 202 may not be in synchronization with the UE 206, if the BS 202 issues the GTS signal to the UE 206 when the UL HARQ buffers are not empty. In such a case, the UE 206 gets synchronized with the BS 202 by performing a HARQ retransmission operation or the SR operation. If the UE 206 receives the GTS signal from the BS 202 when the DL HARQ buffers are not empty, the UE 206 can clear the DL HARQ buffers, thereby indicating that the communication is complete from the BS 202 perspective.

Embodiments herein enable the UE 206 to manage UL traffic (i.e., the data has to be communicated by the UE 206 to the BS 202) while operating in the WUS operation mode. The UE 206 may receive the WUS from the BS 202 before the ON-duration of the DRX cycle in the WUS operation mode. If the received WUS indicates the absence of the PDCCH, the UE 206 checks if the one or more logical channels have the UL data (the UL traffic) to transmit. If the one or more logical channels have the UL data to transmit, the UE 206 derives a formulation/condition based on QoS parameters such as, but not limited to, packet loss, packet latency, packet delay budgets, and so on. If the derived condition satisfies a pre-defined condition, the UE 206 performs the SR masking and/or the SR delay operation on the one or more logical channels with the UL data. The SR masking involves disabling the SR on the one or more logical channels including the UL data by issuing a SR mask to the corresponding one or more logical channels, so that the SR on the one or more logical channels may not be transmitted. The UE 206 may issue (unmask) the SR to the logical channels for resuming the transmission of the pending UL data, when the UE 206 enters into the active state. The SR delay operation involves defining a delay time and applying the delay time on the determined one or more logical channels including the UL data, so that the SR and thereby, UL data pending on the one or more logical channels can be transmitted with the delay. In an embodiment, the UE 206 performs the SR masking and/or the SR delay operation by compensating the packet loss target for the signal and/or Block Error Rate (BLER) and/or the DSDS scenarios.

In an embodiment, the UE 206 can manage the UL traffic by performing data aggregation. The data aggregation involves aggregating the UL data/traffic at the PDCP layer by not allowing the UL data to reach the MAC layer. The UE 206 performs the data aggregation based on the condition derived from the QoS parameters. If the derived condition satisfies the pre-defined condition, the UE 206 performs the data aggregation at the PDCP layer.

Embodiments herein enable the UE 206 to co-ordinate with the BS 202 to dynamically enable or disable the WUS operation mode for monitoring the PDCCH. The UE 206 communicates power saving need indication (PSNI) to the BS 202. The PSNI can include a power saving need status, and a no-power saving need status. The power saving need status indicates that the UE 206 wants to receive the power saving signals from the BS 202 for monitoring the PDCCH (i.e., the UE 206 wants to enable the WUS operation mode). The no-power saving need status indicates that the UE 206 does not want to receive the power saving signal from the BS 202 for monitoring the PDCCH. The UE 206 may include the power saving need status in the PSNI on identifying power saving conditions, and the no-power saving need status in the PSNI on identifying no-power saving conditions. The UE 206 identifies the power saving conditions and the no-power saving conditions by collecting system information. Examples of the power saving conditions can be, but not limited to, enabling of the WUS operation mode by the user, and so on. Examples of the no-power saving conditions can be, but not limited to, the UE 206 is connected to a power source and there is no need for the power saving signal/WUS operation is to be enabled, the user has forcefully disabled the WUS operation mode, the probability of reception of the control channels is greater than a pre-defined threshold (for e.g. 60% or more times the PDCCH carries allocation for the UE 206 in the On-duration of the DRX cycles), the UE 206 is actively receiving at least one service (for example: peak throughput, delay-sensitive service nature), a Buffer Status Report (BSR) associated with the UE 206 is non-zero (indicating an amount of the UL data available at the UE 206), the UE 206 has not initiated enabling of the WUS operation mode, the UE 206 is further pursuing the SR/RACH operations, the UE 206 is further performing mission critical services (for example: Mission-critical push-to-talk (MCPTT) or the like), the UE 206 is further performing critical operations (for example: handovers (HO) operations, Radio Link Failure (RLF) reporting operations, and so on), the UE 206 is in the DSDS scenario and one of the connected stacks of the UE 206 is performing a higher priority task, and so on.

The UE 206 may include the power saving need status or the no-power saving need status based on the identified power saving and no-power saving conditions in the PSNI and sends the PSNI to the BS 202. Based on the received PSNI from the UE 206, the BS 202 configures the UE 206 with the functionalities of the DRX cycle and/or the power saving signals. Thus, the WUS operation is dynamically enabled or disabled based on the power saving requirements of the UE 206.

Embodiments herein enable the UE 206 to manage the power saving signals in Carrier Aggregation (CA) scenarios, while operating in the WUS operation mode. In accordance with the functionalities of the DRX cycle, the UE 206 may monitor the PDCCH for all activated serving cells/Component Carriers (CCs) of a cell group associated with the at least one BS 202 in the wireless communication system 200. The serving cells can include at least one of but not limited to, a primary cell of the Master Cell Group (MCG) and a primary cell of the Secondary Cell Group (SCG) as in the Dual Connectivity (DC) scenarios, a secondary serving cells (SCells), and so on. In an embodiment, the primary cell of the Master Cell Group (MCG), PCell (Primary cell) and the primary cell of the Secondary Cell Group (SCG), PSCell (Primary secondary cell) as in the DC scenarios may be together referred to hereinafter as special cells (SpCells).

In an embodiment, on receiving the WUS for the specific SpCell by indicating the presence of the PDCCH, the UE 206 may monitor the PDCCH for the determined SpCell by providing additional notification for all other secondary serving cells (SCells) in the cell group. In an embodiment, the UE 206 may monitor the PDCCH for the SpCell by receiving a carrier identification bitmap in the power saving signal from the BS 202. The carrier identification bitmap represents the applicable activated serving cells (the SCells/CCs, the serving secondary cells, or the like) and the corresponding set of PDCCH monitoring information. Thus, limiting the monitoring of the PDCCH for the SpCell may reduce the power consumption of the UE 206.

Embodiments herein enable the UE 206 to manage the WUS operation in the MUSIM scenarios. In an embodiment, if the UE 206 enters into the MUSIM scenario, while operating in the WUS operation mode, the UE 206 may disable the WUS operation.

In an embodiment, if the UE 206 enters into the MUSIM scenario, while operating in the WUS operation mode, the UE 206 may consider the WUS operation mode and prioritizes the reception of the WUS from the BS 202 on one of the connected stacks to minimize loss of WUS signaling.

In an embodiment, if the UE 206 enters into the MUSIM scenario, while operating in the WUS operation mode and if the UE 206 is connected to the RATs using multi-stacks with the WUS operation, the UE 206 prioritizes the reception of the WUS on all the stacks (the multiple stacks).

If prioritizing the reception of the WUS on the multiple stacks is not feasible, the UE 206 performs RF resource arbitration for the reception of the WUS. In an example herein, consider that the UE 206 is using the two stacks of different RATs (i.e., DC scenario). In such a case, the RF resource arbitration enables the UE 206 to use a first stack of the two stacks to monitor the reception of the WUS for a 50% of time in the DRX cycle and a second stack of the two stacks to monitor the reception of the WUS for remaining 50% of time in the DRX cycle.

In an embodiment, if the UE 206 enters into the MUSIM scenario, while operating in the WUS operation mode, the UE 206 utilizes information about the WUS signaling for performing MUSIM scheduling (for example; faster switching to other stacks, scheduling longer pauses on other stacks for the measurement operations, and so on).

Embodiments herein enable the UE 206 to perform efficient and adaptive monitoring of the WUS. The UE 206 may disable the WUS operation on identifying at least one no-power saving condition. Examples of the no-power saving conditions can be, but not limited to, the UE 206 is in actively receiving the service (e.g. peak throughput, delay-sensitive service nature), the BSR is non-zero, the UE 206 has not initiated/indicated for the power saving conditions, the UE is pursuing the SR/RACH operations, the UE 206 is performing the mission critical applications (like the MCPTT), the UE 206 is performing critical operations (such as the HO operations, the RLF operations, or the like), the UE 206 is in the DSDS scenario, and one of the two connected stacks is performing high priority task, and so on.

Embodiments herein enable the UE 206 to manage its power consumption, while operating in the RRC connected mode based on the power saving signal. In an embodiment, to reduce the power consumption, the UE 206 may enter into the RRC idle mode, or an RRC inactive mode, or a power efficient state within the RRC connected mode from the RRC connected mode. The UE 206 may not establish the RRC connection with the BS 202 in the RRC idle mode, and the RRC Inactive mode. In the RRC idle mode, the UE 206 may camp onto the at least one cell/BS 202 by performing cell selection/re-selection process. In the RRC inactive mode, the BS 202 may track the reach ability of the UE 206 using assistance information received from the CN 204. The power efficient state in the RRC connected mode can be a low power consumption state, wherein the monitoring of the PDCCH can be enabled based on the power saving signal/WUS. In the power efficient state within the RRC connected mode, the UE 206 can enter into the sleep state. In an embodiment herein, the UE can enter into the sleep state by skipping the monitoring of the PDCCH. In an embodiment herein, the UE can enter into the sleep state by reducing the monitoring of the PDCCH. Thus, the power efficient state can be supported by enabling reduced PDCCH monitoring through the power saving signals. Further, the power efficient state can be built with a different set(s) of DRX configuration parameters than the RRC connected DRX. Examples of the DRX configuration parameters used to build the power efficient state can be, but not limited to, a DRX cycle length, the On-duration timer, the Inactivity timer for the power efficient state with different values, or any other configuration parameters that enhance the sleep operations for the UE 206 and save power.

In an embodiment, the UE 206 may send state transition assistance information to the BS 202, while operating in the RRC connected mode. The state transition assistance information may include information about network factors (such as the UL traffic, the DL traffic, and so on), UE preferred RRC state, power status of the UE 206, and so on. Based on the received state transition assistance information from the UE 206, the BS 202 determines the transition RRC state for the UE 206. The BS 202 then transmits the transition commands in the L1 signaling message to the UE 206, wherein the transition commands indicate the determined transition RRC state for the UE 206. The determined transition RRC state can correspond to at least one of the RRC idle mode, the RRC inactive mode, and the power efficient state. Thus, the UE 206 may transit from the RRC connected mode to one of the RRC idle mode, or the RRC inactive mode, or the power efficient state in the RRC connected mode for reducing power consumption.

FIG. 2 shows exemplary units of the wireless communication system 200, but it is to be understood that other embodiments are not limited thereon. In other embodiments, the wireless communication system 200 may include less or more number of units. Further, the labels or names of the units are used only for illustrative purpose and does not limit the scope of the embodiments herein. One or more units can be combined together to perform same or substantially similar function in the wireless communications system 200.

FIG. 3 depicts the UE 206 of the wireless communication system 200, according to embodiments as disclosed herein.

The UE 206 includes a transceiver 302, a memory 304, a communication unit 306, a display 308, and a controller 310. The UE 206 can also include a processing circuitry, a storage unit, an Input/Output (I/O) module, and so on (not shown).

The RF transceiver 302 can be configured to receive the RF signals from the at least one BS 202 or any other external entity (not shown). In an embodiment, the RF signals may correspond to the power saving signals (the WUS and the GTS signal), the downlink control information that can be received over the monitored PDCCH, the measurement resources, and so on. The RF transceiver 302 can also be configured to transmit the RF signals (corresponding to the UL data) to the at least one BS 202. The RF transceiver 302 may include a processing circuitry (not shown) for processing the received RF signals.

The memory 304 can store at least one of the DRX cycle configurations, the power saving signals configurations, the pre-defined conditions for performing the SR masking, and/or the SR delay operation, the pre-defined conditions for performing the data aggregation, the power saving conditions, the no-power saving conditions, and so on. Examples of the memory 304 can be, but not limited to, NAND, embedded Multi Media Card (eMMC), Secure Digital (SD) cards, Universal Serial Bus (USB), Serial Advanced Technology Attachment (SATA), solid-state drive (SSD), and so on. Further, the memory 304 may include one or more computer-readable storage media. The memory 304 may include one or more non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 304 may, in some examples, be considered a non-transitory storage medium. The term "non-transitory" may indicate that the storage medium is not embodied in a carrier wave or a propagated signal. However, the term "non-transitory" should not be interpreted to mean that the memory 304 is non-movable. In certain examples, a non-transitory storage medium may store data that can, over time, change (e.g., in Random Access Memory (RAM) or cache).

The communication unit 306 can be configured to enable the UE 206 to communicate with the BS 204 using an interface supported by the at least one RAT. Examples of the interface can be, but is not limited to, a wired interface, a wireless interface (for example: an air interface, an Uu interface, or the like), a wireless fronthaul interface, a wired or wireless backhaul interface, or any structure supporting communications over a wired or wireless connection.

The display 308 can be configured to enable the user to interact with the UE 206. The display 308 can also be configured to provide a WUS operation disable option and a WUS operation enable option to the user and to allow the user to select one of the displayed options.

The controller 310 can be at least one of a single processer, a plurality of processors, multiple homogeneous or heterogeneous cores, multiple Central Processing Units (CPUs) of different kinds, microcontrollers, special media, and other accelerators. The controller 310 can be configured to control operations of the components (302-308) of the UE 206. In an embodiment, the controller 310 can be configured to enable the RF transceiver 302 to receive the power saving signals configurations and the DRX cycle configurations. In an embodiment, the controller 302 can be configured to enable the WUS operation based on the received power saving signal configurations, and enable the UE 206 to monitor the PDCCH based on the received power saving signals. In an embodiment, the controller 310 can be configured to manage the UL traffic, the RRC state transitions, monitoring of the PDCCH for the SpCells, the MUSIM scenario, and so on while operating in the WUS operation mode. In an embodiment, the controller 310 can be configured to dynamically disable or enable the WUS operation mode based on the power saving conditions and the no-power saving conditions.

As depicted in FIG. 4, the controller 310 includes a WUS operation managing module 402, a UL traffic managing module 404, a CA managing module 406, a MUSIM managing module 408, and a RRC state transition managing module 410.

The WUS operation managing module 402 can be configured to enable the WUS operation on receiving the DRX configurations and the power saving signals configurations from the BS 202 in the RRC signaling. The WUS operation managing module 402 can also enable the WUS operation on selecting the WUS operation enable option by the user through the display 308.

On enabling the WUS operation, the WUS operation managing module 402 may receive the WUS signal from the BS 202 through the RF transceiver 302 before the ON-duration of the DRX cycle. On receiving the WUS from the BS 202, the WUS operation managing module 402 determines the presence or absence of the PDCCH (based on the received WUS). If the received WUS indicates the presence of the PDCCH, the WUS operation managing module 402 enables the UE 206 to enter into the active state during the ON-duration of the DRX cycle for monitoring the PDCCH for the downlink control information in the active time of the DRX cycle. The WUS operation managing module 402 enables the UE 206 to enter into the active state by turning ON the RF transceiver 302. If the received WUS indicates the absence of the PDCCH, the WUS operation managing module 402 enables the UE 206 to enter into the sleep state by skipping the monitoring of the PDCCH in the ON-duration of the DRX cycle. The WUS operation managing module 402 enables the UE 206 to enter into the sleep state by turning OFF the RF transceiver 302. Thus, the power consumption may be reduced.

The WUS operation managing module 402 can also be configured to receive the GTS signal for the early sleep state from the BS 202 through the RF transceiver 302, when the WUS operation is enabled. The WUS operation managing module 402 may receive the GTS signal from the BS 202 during the active time of the DRX cycle. On receiving the GTS signal from the BS 202, the WUS operation managing module 402 enables the UE 206 to send the HARQ ACK to the BS 202 indicating the successful reception of the GTS signal. On receiving the GTS signal from the BS 202, the WUS operation managing module 402 enables the UE 206 to enter into the sleep state by skipping/abandoning the monitoring of the additional control channels during the active time.

The WUS operation managing module 402 can also be configured to receive the PDCCH adaptation signaling from the BS 202 through the RF transceiver 302, on enabling the WUS operation mode. The PDCCH adaptation signaling indicates the power saving approach for the UE 206. Examples of the power saving approach can be, but is not limited to, a cross-slot scheduling based PDCCH monitoring, or the like. On receiving the PDCCH adaptation signaling, the WUS operation managing module 402 sends the HARQ ACK to the BS 202 indicating the successful reception of the PDCCH adaptation signaling and enables the UE 206 to skip the continuous monitoring of the PDCCH in the active time of the DRX cycle, according to the power saving approached indicated by the received PDCCH adaptation signaling.

The WUS operation managing module 402 can also be configured to receive the measurement resources from the BS 202 through the RF transceiver 302 in the time gap between the WUS and the ON-duration of the DRX cycle. The WUS operation managing module 402 also receives the number of samples and the duration for the measurement resources from the BS 202 based on the mobility management and the signal strength of the UE 206. On receiving the measurement resources, the number of samples, and the duration for the measurement resources, the WUS operation managing module 402 performs the measurement operations using the measurement resources. The measurement operations may be performed to estimate the channel related factors such as, but not limited to, the channel quality information, the channel tracking, the channel tuning, and so on. The WUS operation managing module 402 further reports the measured channel related factors to the BS 202.

The WUS operation managing module 402 can also be configured to dynamically enable or disable the WUS operation by co-coordinating with the BS 202. In an embodiment herein, the WUS operation managing module 402 can collect the system information continuously. In an embodiment herein, the WUS operation managing module 402 can collect the system information periodically. In an embodiment herein, the WUS operation managing module 402 can collect the system information on occurrence of pre-defined events. The WUS operation managing module 402 can identify conditions of the UE 206 at the current instance of time. The conditions can include the power saving conditions indicating that the UE 206 wants to receive the power saving signals from the BS 202 and the no-power saving conditions indicating that the UE 206 does not want to receive the power saving signal from the BS 202. Examples of the power saving conditions can be, but not limited to, selection of the WUS operation enable option set by the user, no UL/DL traffic for stipulated time, and so on. Examples of the no-power saving conditions can be, but not limited to, the UE 206 is connected to a power source and there is no need for the power saving signal/WUS operation is to be enabled, a user has forcefully disabled the WUS operation mode, the probability of reception of the control channels (i.e. PDCCH carrying data allocations for the UE 206) is greater than the pre-defined threshold, the UE 206 is actively receiving at least one service (for example: peak throughput, delay-sensitive service nature), the BSR is non-zero, the UE 206 has not initiated enabling of the WUS operation mode, the UE 206 is pursuing the SR/RACH operations, the UE 206 is performing at least one mission critical service (for example: the MCPTT), the UE 206 is performing at least one critical operation (for example: the HO operations, the RLF operations, and so on), the UE 206 is in DSDS scenario and one of the connected stacks is performing higher priority task, and so on.

Based on the determined conditions, the WUS operation managing module 402 prepares the PSNI for the BS 202. The PSNI can comprise status information including the power saving need status or the no-power saving need status. The WUS operation managing module 402 may include the power saving need status in the PSNI, when the determined conditions include the power saving conditions. The WUS operation managing module 402 may include the no-power saving need status in the PSNI, when the determined conditions include the no-power saving conditions. The WUS operation managing module 402 then transmits the PSNI (including either the power saving need status or the no-power saving need status) to the BS 202. In an embodiment, the WUS operation managing module 402 may transmit the PSNI to the BS 202 in a L1 signaling message (such as, but not limited to, the MAC CE, or the like). In an embodiment, the WUS operation managing module 402 may transmit the PSNI to the BS 202 in the RRC signaling message. In an embodiment, the WUS operation managing module 402 may send the PSNI to the BS 202 on occurrence of pre-defined power saving events. In an embodiment, the WUS operation managing module 402 may send the PSNI to the BS 202 continuously. In an embodiment, the WUS operation managing module 402 may send the PSNI to the BS 202 at periodical intervals.

On receiving the PSNI from the UE 206, the BS 202 dynamically determines whether to enable or disable the power saving signals for the UE 202 based on the power saving status, included in the PSNI. The BS 202 enables the power saving signals for the UE 202, if the PSNI includes the power saving need status. The BS 202 disables the power saving signals for the UE 202, if the PSNI includes the no-power saving need status. In an embodiment, the BS 202 may enable or disable the power saving signals for the UE 202, irrespective of the PSNI of the UE 202. The BS 202 may calculate a probability of scheduling data for the UE 206 (or a group of the UEs 206) and/or current bandwidth requirement of the BS 202. The BS 202 compares the calculated probability of scheduling data with a pre-defined probability threshold value and the bandwidth requirement for the BS 202 with the with a pre-defined bandwidth threshold value. In an embodiment, the probability threshold value can be pre-defined based on downlink scheduling rate for the UE 206. For example, the pre-defined probability threshold value can be a downlink scheduling rate for the UE 206, which falls below 60% (that implies that the UE 206 allocated resources less than 60% of all the allocation opportunities). In an embodiment, the bandwidth threshold value can be pre-defined based on overall resource allocation for the power saving signals for the UE 206. In an example herein, the pre-defined bandwidth threshold value can be the overall resource allocation for the power saving signal for all the UEs 206 is less than 90% of total capacity. If the probability of scheduling data is less than the pre-defined probability threshold value, and/or the bandwidth requirement is less than the pre-defined bandwidth threshold value, the BS 202 configures the power saving signals to the UE 204 and transmits the enabled power saving signals configurations to the UE 206 in the RRC signaling message. On receiving the enabled power saving signals configurations, the WUS operation managing module 402 enables the WUS operation on the UE 206. The BS 202 disables the power saving signals for the UE 206 or does not configure the power saving signals for the UE 206, if the calculated probability of scheduling data is greater than the pre-defined probability threshold value, and the bandwidth requirement is greater than the pre-defined bandwidth threshold value. Once the BS 202 has disabled the power saving signals for the UE 206, the WUS operation managing module 402 disables the WUS operation on the UE 206.

The WUS operation managing module 402 can also be configured to disable the WUS operation on the UE 206 locally on determining that at least one no-power saving condition is satisfied. On enabling the WUS operation on the UE 206, the WUS operation managing module 402 may monitor the system information to determine the no-power saving conditions. The no-power saving conditions are events and/or situations as encountered by the UE 206. Examples of the no-power saving conditions can be, but not limited to, the UE 206 is connected to a power source and there is no need for the power saving signal/WUS operation is to be enabled, a user has forcefully disabled the WUS operation mode, the probability of reception of the control channels is greater than the pre-defined threshold (for example: the PDCCH carrying DCI allocation for the UE 206, which falls below 60% of overall allocations), the UE 206 is in actively receiving at least one service (for example: peak throughput, delay-sensitive service nature), the BSR is non-zero, the UE 206 has not initiated/indicated for enabling of the WUS operation mode, the UE 206 is pursuing the SR/RACH operations, the UE 206 is performing the critical services (for example: the MCPTT), the UE 206 is performing critical operations (for example: the HO operations, RLF operations, and so on), the UE 206 is in DSDS scenario and one of the stacks is performing higher priority task, and so on. Once the no-power saving conditions are determined, the WUS operation managing module 402 disables the WUS operation on the UE 206. On disabling the WUS operation, the WUS operation managing module 402 enables the UE 206 to monitor the PDCCH during the ON-duration of the DRX cycle. The WUS operation managing module 402 further enables the RF transceiver 302 to abandon the reception of the power saving signals from the BS 202, on the WUS operation being disabled. In addition, the WUS operation managing module 402 provides an indication to the user to manage a power saving feature on the UE 206, on the WUS operation being disabled.

The UL traffic managing module 404 can be configured to manage the UL data or UL traffic of the UE 206 while operating in the WUS operation. In an embodiment, the UL traffic managing module 404 can manage the UL data by performing the SR masking and/or the SR delay operation. For performing the SR masking and/or the SR delay operation, the UL traffic managing module 404 determines the one or more logical channels on which the SR masking and/or the SR delay operation, on enabling the WUS operation.

On receiving the WUS from the BS 202, the UL traffic managing module 404 checks if the received WUS indicates the presence or absence of the PDCCH. If the received WUS indicates the presence of the PDCCH, the UL traffic managing module 404 checks for the arrival of the UL data on the determined one or more logical channels (from the higher layers of the UE 206). Once the UL data has arrived on the one or more logical channels, the UL traffic managing module 404 derives the condition from the QoS parameters such as, but not limited to, packet delay budget (PDB), packet loss target, DRX induced delay, and so on during a defined observation window for performing the SR masking and/or the SR delay operation. The UL traffic managing module 404 checks the derived condition with the pre-defined condition. The pre-defined condition can be represented using the below relation:

Perform SR masking and/or SR delay operation=statistics {(DRX induced delay>PDB)<packet loss target} ∥ {DRX induced delay<PDB}, during the observation window In an example herein, the pre-defined condition can be represented using the below equation:

$$Stat[delay_{drx} > T] < (\delta*(1-\xi)*(1-\varphi))[delay_{drx} < T]$$

wherein, 'T' represents the PDB, 'δ' represents the packet loss target, 'ξ' represents the BLER, and 'φ' represents the RF rejection ratio.

The UL traffic managing module 404 further checks if the derived condition satisfies the pre-defined condition. When the derived condition during the defined observation window satisfies the pre-defined condition, the UL traffic managing module 404 performs the SR masking and/or SR delay operation on the determined one or more logical channels with the UL data. The UL traffic managing module 404 performs the SR masking by issuing the SR mask to the determined one or more logical channels with the UL data, so that the SR can be disabled on the corresponding logical channels and the associated UL data may not be transmitted. The UL traffic managing module 404 performs the SR delay operation by issuing the delay to the determined one or more logical channels with the UL data, so that the pending UL data on the corresponding logical channels may be transmitted with the received delay. Thus, the UL data may not disturb the sleep state of the UE 206 while operating in the WUS operation.

In an embodiment, the UL traffic managing module 404 can manage the UL data by performing the data aggregation operations. For performing the data aggregation operations, the UL traffic managing module 404 determines services/bearers at the PDCP layer of the UE 206 on which the data aggregation operations can be performed, on enabling the WUS operation. On receiving the WUS from the BS 202, the UL traffic managing module 404 checks if the received WUS indicates the presence or absence of the PDCCH. If the received WUS indicates the presence of the PDCCH, the UL traffic managing module 404 checks for the arrival of the UL data corresponding to the determined services/bearers at the PDCP layer. Once the UL data has arrived at the PDCP layer, the UL traffic managing module 404 derives the condition from the QoS parameters such as, but not limited to, packet delay budget (PDB), packet loss target, DRX induced delay, and so on during a defined observation window for performing the data aggregation operation.

The UL traffic managing module 404 further checks if the derived condition satisfies the pre-defined condition (i.e., the pre-defined condition used for performing the SR masking and/or the SR delay operation). When the derived condition during the defined observation window satisfies the pre-defined condition, the UL traffic managing module 404 performs the data aggregation operation at the PDCP layer. The data aggregation operation includes aggregating the UL data (corresponding to the determined services/bearers) arrived at the PDCP by not allowing the UL data to reach the MAC layer of the UE 206. Thus, the UL data may not reach the PHY layer, so that the UL data may not be transmitted, when the UE 206 is in the sleep state while operating in the WUS operation mode.

The CA managing module 406 can be configured to monitor the PDCCH for the activated serving CCs/SCells independently (to better suit to traffic characteristics and requirements of the CCs) based on the power saving signals received from the BS 202. On enabling the WUS operation, the CA managing module 406 may receive the WUS from the BS 202. The WUS may include the carrier/SCell identification bitmap. The carrier identification bit map includes information about the applicable activated serving cells (the SpCells, the Scells, or the like of the cell group), and the corresponding set of PDCCH monitoring information. Based on the carrier identification bit map, the CA managing module 406 can determine multiple PDCCH monitoring information corresponding to different activated serving cells/SCells/CCs. The CA managing module 406 may monitor for the reception of the WUS on SpCell from the BS 202 before the ON-duration of the DRX cycle, as the WUS operation is enabled. If the received WUS indicates the presence of the PDCCH, the CA managing module 406 may monitor the PDCCH only for the SCells by notifying all the activated serving cells in the cell group. If the received WUS indicates the specific SCell/CC and the presence of the PDCCH, the CA managing module 406 may monitor the PDCCH for the specific SCell/CC notified in the received WUS on the SpCell using the received carrier identification bitmap. If the received WUS on SpCell indicates the specific SCell/CC and the absence of the PDCCH, the CA managing module 406 does not monitor the PDCCH for the specific SCell/CC notified in the received WUS. The CA managing module 406 may also monitor for the reception of the GTS signal on SpCell while monitoring the PDCCH for the specific SCell/CC. On receiving the GTS signal on the SpCell, the CA managing module 406 stops monitoring the PDCCH for the specific SCell/CC. Thus, the power consumption of the UE 206 may be reduced by restricting the monitoring of the PDCCH for the SCells that have been indicated in the received WUS from the BS 202.

In an embodiment, the CA managing module 406 considers the specific serving cell WUS information, while mapping RLC/MAC packets to the specific carriers with the WUS information indicating the active status. Further, the CA managing module 406 considers the specific serving cell WUS information, while mapping the priority or critical traffic like signalling/control Protocol Data Unit (PDUs), retransmissions, Scheduling Request (SR)/Buffer Status Report (BSR), delay sensitive service packets, and so on in accordance to meet a desired criterion. The desired criterion includes, but not limited to, achieving low latency, reliable transmission, power saving and/or performance efficiency, and so on. In addition, the UE 206 substantiates the WUS information, with at least one of additional information on channel conditions, frequency of operation (e.g. Frequency Range FR1 (below 6 GHZ), Frequency Range FR2 (above 6 GHZ)) on one or more specific carrier cells in determining the mapping of traffic packets to specific carrier cells. Thus, the UE 206 can determine which carrier cell are more robust and have wider coverage and so on and arrives a better decision for mapping the traffic to the most suitable carrier cell.

The MUSIM managing module 408 can be configured to manage the WUS operation during the MUSIM scenarios. In the MUSIM scenario, the UE 206 can be connected to the same or different RATS using the one or more stacks for establishing the communication with the BS 202. Further on each of the stack, the UE 206 can perform multiple different operations such as, but not limited to, paging reception, measurements, signaling, data reception, and so on. The multiple operations may include have different requirements in terms of execution times and priorities in terms of stack operation. For example, the paging reception is periodic and takes less execution time in range of 30 ms, whereas the measurement operations are longer, which can take about 200 ms. The paging and measurement operations can be assigned with more priority to data reception in order to not miss the paging for call and sustaining cell connectivity respectively. Therefore, the MUSIM managing module 408 has to schedule these operations internally on each stack apart from scheduling among to stacks.

Embodiments herein are further explained the managing of the WUS operation by considering that the UE 206 is connected to the RATs supported by the two stacks (the DC/DSDS scenario/state) for establishing the communication with the BS 202, but it may be obvious to a person skilled in the art that the UE 206 may connect to two or more RATs supported by two or more stacks.

In an embodiment, the MUSIM managing module 408 can disable the WUS operation mode, if the UE 206 operates in the DSDS scenario (i.e., when the UE 206 connects to the RATs supported by the two stacks).

In an embodiment, the MUSIM managing module 408 priorities the reception of the WUS during the DSDS scheduling. Prioritizing the reception of the WUS may minimize the loss of WUS signaling. The MUSIM managing module 408 may assign a higher priority to the reception of the WUS, compared to the priority assigned for other operations/services. In an example, the MUSIM managing module 408 may assign a higher priority to the reception of the WUS as compared to a priority of a paging operation.

In an embodiment, the MUSIM managing module 408 can be configured to prioritize the reception of the WUS on the two stacks being used by the UE 206 in the DSDS scenario. If the MUSIM managing module 408 is not able to prioritize the reception of the WUS on both the stacks, the MUSIM managing module 408 performs the RF resource arbitration for the reception of the WUS from the BS 202 (i.e. DSDS schedules among the two stacks for the purpose of receiving the WUS). In an embodiment, the MUSIM managing module 408 may perform the arbitration based on priority of services that are ongoing on the connected stacks. In an embodiment, the MUSIM managing module 408 may perform the arbitration using an arbitration method like a round robin method or the like. In an embodiment, according to the arbitration method, the MUSIM managing module 408 may receive a resource request from one of the stacks and reject or grant the received resource request depending on the ongoing request by the peer stack. Further, the MUSIM managing module 408 may add a new input parameter as the WUS signaling and provide the high Priority to the added WUS signaling based on the conditions as 2 Stacks are on NR-NR RATs (for example), and both have the WUS reception enabled. In an embodiment, the MUSIM managing module 408 schedules the WUS reception based on if any conflicts occur or considering there is high Priority data reception on going on a particular stack and so on.

In an embodiment, the MUSIM managing module 408 may disable the WUS operation in the DSDS scenario by measuring the metrics of the UE 206. In an embodiment, the MUSIM managing module 408 may prioritize the reception of the WUS signaling in the DSDS scenario by measuring the metrics of the UE 206. In an embodiment, the MUSIM managing module 408 may perform the RF resource arbitration in the DSDS scenario by measuring the metrics of the UE 206. Examples of the metrics can be, but not limited to, data reception, performance of the UE 206, battery status, service requirements, and so on.

In an embodiment, the MUSIM managing module 408 can perform the DSDS scheduling using the WUS received from the BS 202. If the received WUS indicates the absence of the PDCCH for one or more DRX cycles, the MUSIM managing module 408 performs the DSDS scheduling. The DSDS scheduling may include at least one of enabling the UE 206 for faster switching to the other stack from the connected stack, scheduling longer DSDS pauses for performing the measurement operations, and so on. Thus, the power consumption of the UE 206 may be reduced using the power saving signals in the DSDS scenarios. In an embodiment, the DSDS scheduling includes:

obtaining, by the MUSIM managing module 408, information on the service parameters from each stack and configurations for WUS, paging, measure, MIB/SIB read, PS Data, Cell Selection, and so on;

receiving, by the MUSIM managing module 408, a resource request from each protocol stack with the kind of service it requires, when the RF is not currently available with itself;

considering, by the MUSIM managing module 408, the resource requests and determining the priority of operation for specific protocol stack as compared to priority of the other stack ongoing task to reject or accept the request;

evaluating, by the MUSIM managing module 408, the time-gap between the WUS operation and non-WUS (e.g. PDCCH monitoring) operation and providing sufficient RF scheduling opportunity to the other stack based on evaluated time-gap and other stack RF timing requirement;

ensuring, by the MUSIM managing module 408, the higher priority to the WUS (An example of priorities could be in decreasing order is WUS>Paging>Measurement>signaling>data reception), at the prioritization step as considering the WUS with high Priority ensures the proper usage of the RF resources;

scheduling, by the MUSIM managing module 408, the RF resource to protocol stack in accordance to determination of priority which is pre-defined in table giving the WUS signaling High Priority when WUS is configured. When conflict for priority happens with (WUS vs WUS) on both the stacks, step for resolution may be based on one of fair and proportional approaches examples of which include, but not limited to, round-robin approach which alternately schedules one of the two stacks, random selection approach which randomly selects among to stack wherein random selection is uniformly distributed and/or approaches which are biased for one of the stacks with a factor in accordance to its significance defined for RAT type/Data type/priorities of operation (services) e.g. RF grant (and/or rejection) ratio for both stacks are not equal when resource requests is raised by them to the MUSIM managing module 408;

utilizing, by the MUSIM managing module 408, the WUS information of one protocol stack to perform resource scheduling e.g. duration for other protocol stack (and schedule relevant jobs there);

scheduling, by the MUSIM managing module 408, the RF resource to other protocol stack, if the GTS is received on one stack and this stack moves to early sleep state due to GTS, DSDS scheduler immediately schedules; and considering, by the MUSIM managing module 408, the PDCCH adaptation information in order to schedule the RF resource to other protocol stack, if the PDCCH adaptation is received on one stack and this stack PDCCH monitoring due to PDCCH adaptation.

The RRC state transition managing module 410 can be configured to manage transitions of the UE 206 from the RRC connected mode to the RRC idle mode/RRC inactive mode/power efficient state in the RRC connected mode, while operating in the WUS operation mode. The RRC state transition managing module 410 may send the state transition assistance information to the BS 202 for enabling the UE 206 to transit to the RRC idle mode/RRC inactive mode/power efficient state in the RRC connected mode from the RRC connected mode. In an embodiment, the RRC state transition managing module 410 may send the state transition assistance information to the BS 202 on triggering/occurrence of one or more events/scenarios. Examples of the events can be, but not limited to, the battery of the UE 206 is in drained state, the UE is not connected to the power source/battery, the UE 206 is at cell edge and consuming high UL transmission power, the aggregating uplink traffic/traffic volume of the UE 206 indicating an end of a traffic session, and so on. In an example, the state transition assistance information includes information about at least one of, but not limited to, current battery level of the UE 206, UL traffic pattern/traffic volume present on the UE 206, UL transmission power pattern of the UE 206, a UE preferred RRC state (for example: the RRC idle mode, the RRC inactive mode or the power efficient state in the RRC connected mode), the event/reason triggered for sending the state transition assistance information to the BS 202 (for example: the battery condition of the UE 206, the traffic pattern associated with the UE 206, or the like), and so on. In an embodiment, the RRC state transition managing module 410 may send the state transition assistance information to the BS 202 in the MAC signaling message. In an embodiment, the RRC state transition managing module 410 may send the state transition assistance information to the BS 202 in the RRC signaling. In an embodiment, the RRC state transition managing module 410 may send the state transition assistance information as the PSNI to the BS 202.

In response to the sent state transition assistance information, the UE 206 may receive the transition commands from the BS 202 in the L1 or MAC or RRC signaling message. The transition commands may specify the transition RRC state for the UE 206. On receiving the transition commands, the RRC state transition managing module 410 enables the UE 206 to transit into the transition RRC state specified in the received transition commands. The transition RRC state may correspond to the RRC idle mode or the RRC inactive mode or the power efficient state in the RRC connected mode.

If the UE 206 transits into the power efficient state in the RRC connected mode, the RRC state transition managing module 410 initiates the data inactivity timer. On the expiry of the data inactivity timer, the RRC state transition managing module 410 enables the UE 206 to transit into the RRC idle mode from the power efficient state in the RRC connected mode. The RRC state transition managing module 410 may further enable the UE 206 to transit into the RRC inactive mode/RRC idle mode on receiving an RRC Release message from the BS 202. The BS 202 may send the RRC Release message to the UE 206 on determining data activity for the UE 206 in at least one of the UL and DL direction. The RRC state transition managing module 410 may further enable the UE 206 to transit into the RRC connected mode from the power efficient state in the RRC connected mode on receiving the transition commands from the BS 202 in the L1 signaling message.

FIG. 3 shows exemplary units of the UE 206, but it is to be understood that other embodiments are not limited thereon. In other embodiments, the UE 206 may include less or more number of units. Further, the labels or names of the units are used only for illustrative purpose and does not limit the scope of the embodiments herein. One or more units can be combined together to perform same or substantially similar function in the UE 206.

FIG. 5 is a flow diagram 500 depicting a method for monitoring the PDCCH using the power saving signals in the wireless communication system 200, according to embodiments as disclosed herein.

At step 502, the method includes enabling, by the UE 206, the WUS operation mode on receiving configurations of the DRX cycle, and the power saving signals from the BS 202. The power saving signals may include the WUS and the GTS signal.

At step 504, the method includes receiving, by the UE 206, the WUS from the BS 202 before the ON-duration of the DRX cycle, while operating in the WUS operation mode.

At step 506, the method includes monitoring, by the UE 206, the PDCCH by performing transition into the active state, if the received WUS indicates the presence of the PDCCH.

At step 508, the method includes performing, by the UE 206, the transition into the sleep state by skipping the monitoring of the PDCCH in the ON-duration of the DRX cycle, if the received WUS indicates the absence of the PDCCH.

At step 510, the method includes receiving, by the UE 206, the GTS signal from the BS 202 while monitoring the PDCCH in the active time of the DRX cycle.

At step 512, the method includes performing, by the UE 206, the transition into the sleep state by abandoning the monitoring of the PDCCH/additional control channels in the active time. The various actions in method 500 may be performed in the order presented, in a different order or simultaneously. Further, in some embodiments, some actions listed in FIG. 5 may be omitted.

FIG. 6 is an example diagram depicting monitoring of the PDCCH based on the power saving signals, according to embodiments as disclosed herein. Embodiments herein enable the UE 206 to enable the WUS operation mode by supporting the functionalities of the DRX cycle, and the power saving signals (the WUS and the GTS signals).

On enabling the WUS operation mode, the UE 206 receives the WUS from the BS 202 before the ON-duration of the DRX cycle. If the received WUS indicates the presence of the PDCCH, the UE 206 enters into the active state and monitors the PDCC during the active time of the DRX cycle for the downlink control information. If the received WUS indicates the absence of the PDCCH, the UE 206 may skip the On-duration in the DRX cycle, as depicted in FIG. 6.

While operating in the WUS operating mode, the UE 206 may receive the GTS signal from the BS 202, if the additional monitoring of the PDCCH is not required in the active time of the DRX cycle. On receiving the GTS signal, the UE 206 transmits the HARQ ACK to the BS 202 indicating the successful reception of the GTS signal, and abandons the monitoring of the PDCCH by entering into the sleep state early.

The UE 206 may also receive the measurement resources and information about the number of samples and the duration of the measurement resources (that are determined based on the mobility management and the signal strength of the UE 206) from the BS 202 in the gap between the WUS and the ON-duration of the DRX cycle. The UE 206 may use the received measurement resources and the information for measuring the channel related factors. Thus, the power consumption of the UE 206 may be reduced in the WUS operation mode.

FIG. 7 is an example flow diagram depicting a method for managing the UL traffic while operating in the WUS operation mode, wherein the UL traffic is managed by performing the SR masking and/or SR delay operation, according to embodiments as disclosed herein. Embodiments herein enable the UE 206 to enable the WUS operation mode by supporting the functionalities of the DRX cycle, and the power saving signals (the WUS and the GTS signals).

At step 702, the UE 206 checks if the WUS operation is enabled. If the WUS operation is enabled, at step 704, the UE 206 determines the logical channels on which the SR masking and/or SR delay operations can be performed. At step 706, the UE 206 receives the WUS from the BS 202 and checks if the received WUS indicates the presence of the PDCCH. If the received WUS indicates the absence of the PDCCH (i.e. DRX Sleep), at step 708, the UE 206 checks for the arrival of the UL data on the determined logical channels. If the UL data has arrived on the determined logical channels, at step 710, the UE 206 derives the condition/formulation based on the QoS parameters and compares the derived condition with the pre-defined condition (statistics {(DRX induced delay>PDB)<packet loss target} || {DRX induced delay<PDB}, during the observation window). If the derived condition satisfies the pre-defined condition, at step 712, the UE 206 performs the SR masking and/or the SR delay operation on the determined logical channels with the UL data. If the WUS indicates the presence of the PDCH, or the UL data does not arrive on the determined logical channels, or the derived condition does not satisfy the pre-defined condition, at step 714, the UE 206 does not perform the SR masking and/or the SR delay operation.

Consider an example scenario, wherein a data service channel (an example of the determined logical channel) receives data packets from the higher layers of the UE 206 for the UL transmission, when the UE 206 receives the WUS indicating the absence of the PDCCH from the BS 202. In such a scenario, the UE 206 derives the condition based on at least one of the PDB, the packet loss target, and so on. If the derived condition satisfies the pre-defined condition, the UE 206 performs the SR delay operation by applying the delay on the voice channel, so that the data channel may perform the UL transmission of the received data packets in accordance with the applied delay. Thus, the sleep state of the UE 206 may not be disturbed in the WUS operation mode due to arrival of the UL data.

FIG. 8 is an example flow diagram depicting a method for managing the UL traffic while operating in the WUS operation mode, wherein the UL traffic is managed by performing the data aggregation at the PDCP layer of the UE 206, according to embodiments as disclosed herein. Embodiments herein enable the UE 206 to enable the WUS operation mode by supporting the functionalities of the DRX cycle, and the power saving signals (the WUS, the GTS signals and PDCCH adaptation signaling).

At step 802, the UE 206 checks if the WUS operation is enabled. If the WUS operation is enabled, at step 804, the UE 206 determines the services/bearers for which the data aggregation operation can be performed at the PDCP layer. At step 806, the UE 206 receives the WUS from the BS 202 and checks if the received WUS indicates the presence of the PDCCH. If the received WUS indicates the absence of the PDCCH (i.e. DRX sleep), at step 808, the UE 206 checks for the arrival of the UL data corresponding to the determined services/bearers at the PDCP layer. If the UL data has arrived at the PDCP layer, at step 810, the UE 206 derives the condition/formulation based on the QoS parameters and compares the derived condition with the pre-defined condition (statistics {(DRX induced delay>PDB)<packet loss target} || {DRX induced delay<PDB}, during the observation window). When the derived condition satisfies the pre-defined condition, at step 812 the UE 206 performs the data aggregation at the PDCP layer. The data aggregation operation involves aggregating the UL data at the PDCP layer by preventing the flow of the UL data from the PDCP layer to the MAC layer. If the WUS indicates the presence of the PDCH, or the UL data corresponding to the determined services/bearers does not arrive at the PDCP layer, or the derived condition does not satisfy the pre-defined condition, at step 814, the UE 206 does not perform the data aggregation operation at the PDCP layer.

FIG. 9 is an example flow diagram depicting a method for dynamically enabling or disabling the WUS operation mode based on requirements of the power saving signals for the UE 206, according to embodiments as disclosed herein. In an example herein, consider that the BS 202 may be a gNB 202.

At step 902, the gNB 202 checks if the UE 206 supports the PSNI. If the UE 206 does not support the PSNI, at step 904, the gNB 202 determines whether to enable or disable the power saving signals based on the probability of scheduling the data for the UE 206 and the bandwidth requirements. If the UE 206 supports the PSNI, at step 906, the gNB 202 checks whether the gNB 202 requires the PSNI from the UE 206 to enable/disable the power saving signal for the UE 206. On checking that the gNB 202 does not require the PSNI from the UE 206 to enable/disable the power saving signal, the gNB 202 repeats the step 904.

On checking that the gNB 202 requires the PSNI from the UE 206 to enable/disable the power saving signal, at step 908, the gNB 202 triggers the UE 206 to send the PSNI. At step 910, the gNB 202 receives the PSNI from the UE 206. At step 912, the gNB 202 checks if the received PSNI includes the power saving signals need status or the no-power saving signals need status. If the received PSNI includes the no-power saving signals need status, at step 914*a*, the gNB 202 can determine whether the UE 206 is in the RRC connected mode. At step 914*b*, the gNB 202 may perform a legacy procedure for RRC Release, if the UE 206 is in the RRC connected mode. If the received PSNI includes the no-power saving signals need status, at step 916*a*, the gNB 202 determines that the UE 206 does not want to receive the power saving signals. At step 916*b*, the gNB 202 disables the power saving signals for the UE 206.

If the received PSNI includes the power saving signals need status, at step 918*a*, the gNB 202 determines if the UE 206 wants to transit from the one RRC state to another RRC state. At step 918*b*, the gNB 202 enables the UE 206 to transit from the one RRC state to another RRC state, on determining that the UE 206 wants to transit from the one RRC state to another RRC state. If the received PSNI includes the power saving signals need status, at step 920*a*, the gNB 202 determines if the UE 206 wants to receive the power saving signals for monitoring the PDCCH. At step 920*b*, the gNB 202 enables the UE 206 to receive (or to continue to receive) the power saving signals for monitoring the PDCCH.

FIG. 10 depicts an example scenario of enabling/disabling the power saving signals for the UE 206, according to embodiments as disclosed herein. Consider an example scenario, wherein the gNB 202 may receive the PSNI/power efficient scheme (PES) information from a plurality of UEs 206 (a UE1, a UE2, 쪋 a UEn) that are operating in the WUS operation mode for the reception of the WUS signal from the gNB 202. In such a case, the gNB 202 may determine whether to continue the enablement of the power saving signals for the UEs (UE1-UEn) or to disable the power saving signals for the UEs (UE1-UEn) based on the received PSNI from the UEs (UE1-UEn). In an example herein, the gNB 202 may disable the power saving signals for the UE2 based on the PSNI received from the UE2, and enable the others UEs (the UE1, the UE3 쪋쪋 the UEn) to continue receiving the power saving signals for the monitoring of the PDCCH. The UE2 may send new PSNI to the gNB 202, when the UE2 wants to receive the power saving signals for monitoring of the PDCCH. On receiving the new PSNI, the gNB 202 may enable the power saving signal for the requested UE2.

FIGS. 11*a*, and 11*b* are example flow diagrams depicting a method for managing the CA scenarios based on the power saving signals, according to embodiments as disclosed herein.

FIG. 11*a* is an example flow diagram depicting a method for monitoring the PDCCH for all the activated serving cells independently based on the power saving signals. Embodiments herein enable the UE 206 to enable the WUS operation mode by supporting the functionalities of the DRX cycle, and the power saving signals (the WUS, the GTS signals and the PDCCH adaptation signaling).

At step 1102, the UE 206 checks if the WUS operation is enabled. If the WUS operation is enabled, at step 1104, the UE 206 receives the WUS on the SpCell including the carrier identification bit map from the BS 202, and determines the SCells/CCs and the corresponding PDCCH monitoring information based on the received bit map.

At step 1106, the UE 206 determines if the received WUS on the SpCell indicates the absence of the PDCCH for the specific SCell/CC. If the WUS indicates the absence of the PDCCH and the specific SCell/CC, at step 1108, the UE 206 skips the monitoring of the PDCCH for the specific SCell/CC indicated in the received WUS. If the WUS indicates the presence of the PDCCH and the specific SCell/CC, at step 1110, the UE 206 monitors the PDCCH for the specific SCell/CC indicated in the received WUS.

At step 1112, the UE 206 receives the GTS signal from the BS 202, and checks if the GTS signal is received on SpCell for the specific SCell/CC. If the GTS signal is received on SpCell for the specific SCell/CC, the UE 206 performs the step 1108 by abandoning the monitoring of the PDCCH for the specific SCcell/CC. Otherwise, the UE 206 performs the step 1110 by continuing the monitoring of the PDCCH for the specific SCell/CC.

FIG. 11*b* is a flow diagram depicting a method for managing the CA scenario based on the power saving signal (WUS/GTS/PDCCH adaptation signaling) information, according to embodiments as disclosed herein. At step 1114, the UE 206 checks if the WUS operation is enabled. If the WUS operation is enabled, at step 1116, the UE 206 receives the power saving signal (WUS/GTS/PDCCH adaptation signaling) information on the SpCell. At step 1118, the UE 206 determines and builds metrics of reliability, power saving, latency, and performance efficiency achievable for each serving cell. At step 1120, the UE 206 maps the low latency traffic, control/signaling messages, retransmissions, the SR/BR to best suitable serving cell based on the traffic characteristics, and determined metrics.

FIG. 12*a* is a flow diagram depicting a method for managing the reception of the WUS in the DSDS scenario, according to embodiments as disclosed herein. Embodiments herein are further explained by considering the DSDS scenario/DC scenario, but it may be obvious to a person skilled in the art that the MUSIM scenario can be considered. At step 1202, the UE 206 may start operating in the DSDS scenario, when the WUS operation is enabled. In the DSDS scenario, the UE may use the two stacks of same or different RATs for establishing communication services with the BS 202. At step 1204, the UE 206 measures the metrics for managing the WUS operation in the DSDS scenario. Examples of the metrics can be, but not limited to, data reception, battery status, UE performance, service requirements, and so on. Based on the measured metrics, the UE 206 may perform steps 1206*a*, or 1206*b* or 1206*c*. At step 1206*a*, the UE 206 may disable the WUS operation mode. At step 1206*b*, the UE 206 may prioritize the reception of the WUS signaling on the connected stack to minimize loss of the WUS. At step 1206*c*, the UE 206 may prioritize the reception of the WUS signaling on the both stacks of the UE 206. For example, consider that the UE 206 is using the two stacks of a NR network. In such a case, the UE 206 may prioritize the reception of the WUS signaling on both the stacks. If prioritizing the reception of the WUS signaling is not feasible on both the stacks, the UE 206 performs the arbitration for the reception of the WUS from the BS 202.

FIG. 12*b* is a flow diagram depicting another method for managing the reception of the WUS in the DSDS scenario, according to embodiments as disclosed herein. At step 1208, the UE 206 may start operating in the DSDS scenario, when the WUS operation is enabled. At step 1210, the UE 206 receives the WUS from the BS 202, which indicates the absence of the PDCCH for the one or more DRX cycles. In such a case, at step 1212, the UE 206 uses the WUS for performing the DSDS scheduling. The DSDS scheduling may involve enabling the UE 206 to switch from the one stack to another stack, scheduling longer DSDS pauses for performing the measurement operations, and so on.

FIG. 13 is a flow diagram depicting a method for managing the WUS operation mode based on the power saving conditions, according to embodiments as disclosed herein.

At step 1302, the UE 206 checks if the WUS operation is enabled. If the WUS operation is enabled, at step 1304, the UE 202 determines the no-power saving conditions. Examples of the no-power saving conditions, can be, but not limited to, the UE 206 is connected to a power source and there is no need for the power saving signal/WUS operation to be enabled, a user has forcefully disabled the WUS operation mode, the probability of reception of the control channels is greater than the pre-defined threshold, the UE 206 is in actively receiving at least one service (for example: peak throughput, delay-sensitive service nature), the BSR is non-zero, the UE 206 has not initiated enabling of the WUS operation mode, the UE 206 is pursuing the SR/RACH operations, the UE 206 is performing the mission critical services, the UE 206 is performing critical operations (for example: the HO operations, the RLF operations, and so on), the UE 206 is in DSDS scenario and one of the stacks is performing higher priority task, and so on.

On determining that at least one of the no-power saving conditions has been satisfied, at step 1306, the UE 206 disables the WUS operation locally by skipping the monitoring of the WUS. If the UE 206 does not determine that at least one of the no-power saving conditions has been satisfied, the UE 206 continues to operate in the WUS operation mode.

FIGS. 14a and 14b are example diagrams depicting management of the RRC state transitions using the power saving signals, according to embodiments as disclosed herein. Embodiments herein enable the UE 206 to send the state transition assistance information to the BS 202 while operating in the RRC connected mode. The state transition assistance information may indicate that the UE 204 wants to transit from the RRC connected mode to the RRC idle mode, or the RRC inactive mode or the power efficient state in the RRC connected mode. In an example herein, the UE 206 may send the state transition assistance information to the BS 202 when the battery of the UE 206 is drained and/or when the UE 206 is not connected to the power source and/or when the UE 206 is at the cell edge and consuming high UL transmission power.

On receiving the state transition assistance information from the UE 206, the BS 202 determines the transition RRC state for the UE 206 and sends the transition commands to the UE 206 by indicating the determined transition RRC state. In an example herein consider that the BS 202 determines the power efficient state in the RRC connected mode as the transition RRC state. In such a case, the UE 206 transits to the power efficient state in the RRC connected mode from the RRC connected mode. Thus, reducing power consumption.

The UE 206 may transit to the RRC idle mode from the power efficient state on the expiry of the data inactivity timer. The UE 206 may transit to the RRC inactive mode/RRC idle mode from the power efficient state on receiving the RRC Release message from the BS 202. The UE 206 may transit to the RRC connected mode from the power efficient state on receiving the transition commands from the BS 202.

The embodiments disclosed herein can be implemented through at least one software program running on at least one hardware device and performing network management functions to control the elements. The elements shown in FIGS. 2-4 can be at least one of a hardware device, or a combination of hardware device and software module.

The embodiments disclosed herein describe methods and systems for reducing power consumption of a UE using power saving signals. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written in e.g. Very high speed integrated circuit Hardware Description Language (VHDL) another programming language, or implemented by one or more VHDL or several software modules being executed on at least one hardware device. The hardware device can be any kind of portable device that can be programmed. The device may also include means which could be e.g. hardware means like e.g. an ASIC, or a combination of hardware and software means, e.g. an ASIC and an FPGA, or at least one microprocessor and at least one memory with software modules located therein. The method embodiments described herein could be implemented partly in hardware and partly in software. Alternatively, the invention may be implemented on different hardware devices, e.g. using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments, those skilled in the art will recognize that the embodiments herein can be practiced with modification within the scope of the embodiments as described herein.

The invention claimed is:

1. A method for managing monitoring of a Physical downlink Control Channel (PDCCH) in a wireless communication system, the method comprising:
  enabling, by a User Equipment (UE), a Wake Up Signal (WUS) operation mode, on receiving configurations of a discontinuous reception (DRX) cycle and at least one power saving signal from a Base Station (BS), wherein the at least one power saving signal includes a WUS;
  receiving, by the UE, the WUS from the BS before an On-duration of the DRX cycle in the enabled WUS operation mode;
  monitoring, by the UE, the PDCCH for downlink control information, if the received WUS indicates presence of the PDCCH;
  performing, by the UE, a transition into a sleep state during the ON-duration of the DRX cycle, if the received WUS indicates absence of the PDCCH,
  wherein the at least one power saving signal further includes a Go To Sleep (GTS) signal and a PDCCH adaptation signal, wherein the PDCCH adaptation signal triggers at least one power saving approach;

receiving, by the UE, the GTS signal from the BS in an active time of the DRX cycle if additional monitoring of the PDCCH is not required, wherein the active time of the DRX cycle indicates the monitoring of the PDCCH by the UE for the downlink control information;

sending, by the UE, a Hybrid automatic repeat request (HARQ) acknowledgement (ACK) to the BS on receiving the GTS signal; and performing, by the UE, the transition into the sleep state by abandoning the monitoring of the PDCCH during the active time of the DRX cycle, on sending the HARQ ACK to the BS.

2. The method of claim 1, wherein the On-duration of the DRX cycle is a time period configured for the UE for monitoring the PDCCH by performing the transition into an active state from the sleep state, wherein in the sleep state, the UE turns OFF a Radio Frequency (RF) transceiver to reduce power consumption, wherein in the active state, the UE turns ON the RF transceiver for transmission and reception of data.

3. The method of claim 1, wherein the WUS is occurred at an Xth downlink symbol in a Y slot offset before the ON-duration of the DRX cycle, where $0 \leq X \leq 13$, $Y \geq 1$.

4. The method of claim 1, further comprising:
receiving, by the UE, the PDCCH adaptation signal from the BS in the active time of the DRX cycle;
sending, by the UE, the HARQ ACK to the BS on receiving the PDCCH adaptation signal; and
performing, by the UE, the transition into a power saving state by abandoning a continuous monitoring of the PDCCH during the active time of the DRX cycle on sending the HARQ ACK to the BS, wherein in the power saving state, the UE monitors the PDCCH based on the at least one power saving approach triggered by the received PDCCH adaptation signal.

5. The method of claim 1, further comprising:
receiving, by the UE, measurement resources, and a number of samples and duration for the measurement resources from the BS in a time gap between the WUS and the ON-duration of the DRX cycle, wherein the number of samples and the duration for the measurement resources are specified by the BS based on mobility management of the UE and signal strength; and
performing, by the UE, measurement operations on channel related factors using the received measurement resources, and the number of samples and the duration for the measurement resources.

6. The method of claim 1, further comprising:
managing, by the UE, an uplink traffic while operating in the WUS operation mode by performing at least one of a Schedule Request (SR) masking, and a SR delay operation, wherein managing the uplink traffic by performing at least one of the SR masking and the SR delay operation includes:
determining at least one logical channel for at least one of the SR masking and the SR delay operation, on enabling the WUS operation mode;
determining if the WUS indicates the presence or absence of the PDCCH on receiving the WUS from the BS;
checking for arrival of the uplink traffic on the determined at least one logical channel, if the WUS indicates absence of the PDCCH;
deriving a condition based on at least one Quality of Service (QOS) parameter when the uplink traffic arrives on the determined at least one logical channel, wherein the at least one QoS parameter includes at least one of packet delay budget (PDB), and packet loss target, wherein the packet loss target is adjusted based on a Block Error Rate (BLER) and applicability of at least one scenario that include a Dual Subscriber Identity Module (SIM) Dual Standby (DSDS); and
performing at least one of the SR masking and the SR delay operation on the determined at least one logical channel including the uplink traffic, if the derived condition satisfies a pre-defined condition, wherein the SR masking involves disabling the determined at least one logical channel including the uplink traffic by issuing a SR mask, wherein the SR delay operation involves applying delay on the determined at least one logical channel including the uplink traffic to transmit the uplink traffic according to the applied delay.

7. The method of claim 6, further comprising:
managing, by the UE, an uplink traffic while operating in the WUS operation mode by performing a data aggregation operation, wherein managing the uplink traffic by performing the data aggregation operation includes:
determining at least one of services and bearers at a PDCP layer for the data aggregation operation, on enabling the WUS operation mode;
determining if the WUS indicates the presence or absence of the PDCCH on receiving the WUS from the BS;
checking for arrival of the uplink traffic corresponding to the determined at least one of services, and bearers at the PDCP layer, if the WUS indicates the absence of the PDCCH;
deriving the condition based on the at least one QoS parameter when data packets corresponding to the determined at least one of services, and bearers arrive at the PDCP layer; and
performing the data aggregation operation at the PDCP layer if the derived condition satisfies the pre-defined condition, wherein the data aggregation operation involves aggregating the uplink traffic at the PDCP layer by preventing a flow of the uplink traffic to a Media Access Control (MAC) layer.

8. The method of claim 1, further comprising:
configuring, by the BS, the at least one power saving signal for the UE, wherein configuring the at least one power saving signal includes:
calculating a probability of scheduling data for the UE, and bandwidth requirements of the BS;
enabling the at least one power saving signal for the UE, if the calculated probability of scheduling data for the UE, and bandwidth requirements of the BS satisfy a pre-defined probability threshold and a pre-defined bandwidth threshold respectively; and
disabling the at least one power saving signal for the UE, if the calculated probability of scheduling data for the UE, and bandwidth requirements of the BS do not satisfy the pre-defined probability threshold and the pre-defined bandwidth threshold respectively.

9. The method of claim 8, further comprising:
receiving power saving indication information (PSNI) from the UE;
enabling the at least one power saving signal for the UE, if the received PSNI indicates a "power saving signals need status", wherein the "power saving signals need status" indicates that the UE wants to receive the at least one power saving signal for monitoring the PDCCH; and disabling the at least one power saving signal for the UE, if the received PSNI indicates a "no-power saving signals need status", wherein the "no-power saving signals need status" indicates that the UE does not want to receive the at least one power saving signal for monitoring the PDCCH due to occurrence of no-power saving conditions, wherein the no-power saving conditions includes at least one of the UE is connected to a power source, a user of the UE has forcefully disabled the WUS operation mode, a probability of reception of control channels is greater than a pre-defined threshold, the UE is in actively receiving at least one service, a Buffer Status Report (BSR) associated with the UE 206 is non-zero, the UE has not indicated for enabling of the WUS operation mode, the UE is pursuing SR/Random Access Control (RACH) operations, the UE is performing mission critical services, the UE is performing critical operations, and the UE is in a Dual Subscriber Identity Module Dual Standby (DSDS) state.

10. The method of claim 1, further comprising:

disabling, by the UE, the WUS operation mode locally on determining the occurrence of no-power saving conditions;

monitoring, by the UE, the PDCCH according to the On-duration of the DRX cycle, once the WUS operation mode is being disabled;

enabling, by the UE, the WUS operation mode locally on determining occurrence of power saving conditions; and monitoring, by the UE, the PDCCH according to the at least one power saving signal, once the WUS operation mode is being enabled.

11. The method of claim 1, further comprising:

monitoring, by the UE, the PDCCH for different activated serving cells of a cell group independently based on the received at least one of the WUS, the GTS signal and the PDCCH adaptation signal on at least one special serving cell (SpCell) of the cell group, wherein monitoring, by the UE, the PDCCH for the activated serving cells includes:

receiving the WUS on the at least one SpCell from the BS specifying at least one activated serving cell of the cell group, wherein the at least one activated serving cell includes the at least one SpCell, and at least one secondary serving cell (SCell) of the cell group;

monitoring the PDCCH for the specified at least one activated serving cell by determining PDCCH monitoring information for the at least one activated serving cell using a carrier identification bitmap and by notifying the monitoring of the PDCCH to the at least one secondary serving cell (SCell), if the received WUS indicates the presence of the PDCCH for the specified at least one activated serving cell, wherein the carrier identification bitmap includes information about the activated serving cells of the cell group, and the corresponding PDCCH monitoring information;

skipping monitoring of the PDCCH for the specified at least one activated serving cell, if the received WUS indicates the absence of the PDCCH for the specified at least one activated serving cell;

receiving the GTS signal on the at least one SpCell for the specified at least one activated serving cell;

abandoning the monitoring of the PDCCH on the specified at least one activated serving cell on receiving the GTS signal on the at least one SpCell;

receiving the PDCCH adaptation signal on SpCell for the specified at least one activated serving cell; and abandoning a continuous monitoring of the PDCCH on the specified at least one activated serving cell by applying at least one power saving approach triggered by the received PDCCH adaptation signal, on receiving the PDCCH adaptation signal on the at least one SpCell.

12. The method of claim 11, further comprising:

receiving, by the UE, power saving signal information on the at least one SpCell;

determining, and building, by the UE, metrics including at least one of latency, power saving, reliability, and performance efficiency achievable for each activated serving cell;

identifying, by the UE, traffic characteristics including at least one of channel conditions, and frequency of operation on each activated serving cell; and mapping, by the UE, factors including low latency traffic, control or signaling messages, retransmissions, the SR or the BSR to the at least one activated serving cell based on the determined traffic characteristics and the metrics.

13. The method of claim 1, further comprising:

managing, by the UE, the WUS operation mode, when the UE enters into a multi-Subscriber Identity Module (SIM) (MUSIM) state, wherein in the MUSIM state, the UE connects to same or different Radio Access Technologies (RATs) using a plurality of stacks, wherein managing, by the UE, the WUS operation mode in the MUSIM state includes:

measuring metrics, when the UE enters into the MUSIM state while operating in the WUS operation mode, wherein the metrics include at least one of data reception, battery level of the UE, service reception for the UE, and performance of the UE; and performing at least one of a first action, a second action, and a third action based on the measured metrics, wherein the first action includes disabling the WUS operation mode, the second action includes prioritizing a reception of the WUS on one of the plurality of stacks used by the UE, a third action includes at least one of prioritizing the reception of the WUS on the plurality of stacks, if the UE is connected to the RATs supported by the plurality of stacks and performing a RF resource arbitration for prioritizing the reception of the WUS.

14. The method of claim 13, wherein managing, by the UE, the WUS operation mode in the MUSIM state includes:

receiving the WUS from the BS, on entering into the MUSIM state; and performing MUSIM scheduling, if the received WUS indicates the absence of the PDCCH, wherein the MUSIM scheduling includes switching between the plurality of stacks, and scheduling longer pauses for performing the measurement operations on at least one of the plurality of stacks.

15. The method of claim 1, further comprising:

managing, by the UE, Radio Resource Connection (RRC) state transitions while operating in the WUS operation mode, wherein the RRC state transitions include transition of the UE from a RRC connected mode to an RRC idle mode or an RRC inactive mode, or a power efficient state in the RRC connected mode, wherein in the RRC idle mode and the RRC inactive mode, a RRC connection is not established between the UE, and the BS, wherein in the RRC connected mode, the RRC connection is established between the UE and the BS, wherein in the power efficient state of the RRC connected mode, the UE applies a different set of DRX configuration parameters and monitors the PDCCH based on the reception of the at least one power saving signal.

16. The method of claim 15, wherein managing, by the UE (206), the RRC state transitions includes:

transmitting state transition assistance information to the BS on an occurrence of at least one event, wherein the state transition assistance information includes at least one of a current battery level of the UE, uplink traffic pattern present on the UE, uplink transmission power pattern of the UE, a UE preferred RRC state, and the at least one event occurred for sending the state transition assistance information to the BS, wherein the at least one event includes a battery of the UE is in a drained state, the UE is not connected to a power source, the UE is at a cell edge and consuming high uplink transmission power, and an aggregating uplink traffic of the UE indicating an end of a traffic session;

receiving at least one transition command from the BS in response to the transmitted state transition assistance information, wherein the at least one transition command specifies the RRC idle mode or the RRC inactive mode, or the power efficient state; and performing the transition from the RRC connected mode to the RRC idle mode, or the RRC inactive mode, or the power efficient state specified in the at least one transition command.

17. A method for configuring at least one power saving signal for a User Equipment (UE), the method comprising:

receiving, by a Base Station (BS), power saving indication information (PSNI) from the UE, the PSNI indicating a "power saving signals need status" or a "no-power saving signals need status";

enabling, by the BS, the at least one power saving signal for the UE, if the received PSNI indicates the "power saving signals need status", wherein the "power saving signals need status" indicates that the UE wants to receive the at least one power saving signal for monitoring a physical downlink Control Channel (PDCCH);

disabling, by the BS, the at least one power saving signal for the UE, if the received PSNI indicates the "no-power saving signals need status", wherein the at least one power saving signal includes at least one of a Wake Up signal (WUS), and a Go-To-Sleep (GTS) signal, wherein the "no-power saving signals need status" indicates that the UE does not want to receive the at least one power saving signal for monitoring the PDCCH due to occurrence of no-power saving conditions;

calculating, by the BS, a probability of scheduling data for the UE, and bandwidth requirements of the BS;

enabling, by the BS, the at least one power saving signal for the UE, if the calculated probability of scheduling data for the UE, and bandwidth requirements of the BS satisfy a pre-defined probability threshold and a pre-defined bandwidth threshold respectively; and disabling, by the BS, the at least one power saving signal for the UE, if the calculated probability of scheduling data for the UE, and bandwidth requirements of the BS do not satisfy the pre-defined probability threshold and the pre-defined bandwidth threshold respectively.

18. A method for managing monitoring of a Physical downlink Control Channel (PDCCH) in a wireless communication system, the method comprising:

enabling, by a User Equipment (UE), a Wake Up Signal (WUS) operation mode, on receiving configurations of a discontinuous reception (DRX) cycle and at least one power saving signal from a Base Station (BS), wherein the at least one power saving signal includes a WUS;

receiving, by the UE, the WUS from the BS before an On-duration of the DRX cycle in the enabled WUS operation mode;

monitoring, by the UE, the PDCCH for downlink control information, if the received WUS indicates presence of the PDCCH;

performing, by the UE, a transition into a sleep state during the ON-duration of the DRX cycle, if the received WUS indicates absence of the PDCCH;

receiving, by the UE, measurement resources, and a number of samples and duration for the measurement resources from the BS in a time gap between the WUS and the ON-duration of the DRX cycle, wherein the number of samples and the duration for the measurement resources are specified by the BS based on mobility management of the UE and signal strength; and performing, by the UE, measurement operations on channel related factors using the received measurement resources, and the number of samples and the duration for the measurement resources.

* * * * *